US012446823B2

(12) United States Patent
Russakoff et al.

(10) Patent No.: US 12,446,823 B2
(45) Date of Patent: Oct. 21, 2025

(54) METHOD AND SYSTEM FOR DISEASE ANALYSIS AND INTERPRETATION

(71) Applicant: Voxeleron, LLC, San Francisco, CA (US)

(72) Inventors: Daniel B. Russakoff, Pleasanton, CA (US); Jonathan D. Oakley, Pleasanton, CA (US)

(73) Assignee: Voxeleron Inc., Austin, TX (US)

( * ) Notice: Subject to any disclaimer, the term of this patent is extended or adjusted under 35 U.S.C. 154(b) by 819 days.

(21) Appl. No.: 17/050,221

(22) PCT Filed: Apr. 25, 2019

(86) PCT No.: PCT/US2019/029160
§ 371 (c)(1),
(2) Date: Oct. 23, 2020

(87) PCT Pub. No.: WO2019/210079
PCT Pub. Date: Oct. 31, 2019

(65) Prior Publication Data
US 2021/0369195 A1 Dec. 2, 2021

Related U.S. Application Data

(60) Provisional application No. 62/663,180, filed on Apr. 26, 2018.

(51) Int. Cl.
*A61B 3/10* (2006.01)
*A61B 3/12* (2006.01)
(Continued)

(52) U.S. Cl.
CPC ............ *A61B 5/4842* (2013.01); *A61B 3/102* (2013.01); *A61B 3/12* (2013.01); *A61B 5/7275* (2013.01);
(Continued)

(58) Field of Classification Search
CPC ......... A61B 3/102; A61B 5/0066; A61B 3/12; A61B 6/504; A61B 5/4842; A61B 5/0071;
(Continued)

(56) References Cited

U.S. PATENT DOCUMENTS 6,134,003 A 10/2000 Tearney et al.
6,421,164 B2 7/2002 Tearney et al.
(Continued)

FOREIGN PATENT DOCUMENTS

JP 2005095624 * 4/2005 .......... A61B 5/0066
WO 2016/177722 A1 11/2016

OTHER PUBLICATIONS

Extended European Search Report issued in European Application No. 19793429.2, date of mailing: Dec. 13, 2021, 12 pages.
Sjöstrand, 2017, Arrested Foveal Development in Preterm Eyes: Thickening of the Outer Nuclear Layer and Structural Redistribution Within the Fovea, Investigative Opthalmology & Visual Science, 58(12):4948-4958.

*Primary Examiner* — Brandi N Thomas
(74) *Attorney, Agent, or Firm* — Brown Rudnick LLP; Adam M. Schoen

(57) ABSTRACT

Optical coherence tomography (OCT) data can be analyzed with neural networks trained on OCT data and known clinical outcomes to make more accurate predictions about the development and progression of retinal diseases, central nervous system disorders, and other conditions. The methods take 2D or 3D OCT data derived from different light source configurations and analyze it with neural networks that are trained on OCT images correlated with known clinical outcomes to identify intensity distributions or patterns indicative of different retina conditions. The methods have greater predictive power than traditional OCT analysis because the invention recognizes that subclinical physical changes affect how light interacts with the tissue matter of the retina, and these intensity changes in the image can be (Continued)

distinguishable by a neural network that has been trained on imaging data of retinas.

20 Claims, 19 Drawing Sheets

(51) Int. Cl.
    *A61B 5/00*         (2006.01)
    *G06N 3/08*        (2023.01)
    *G06T 3/40*         (2006.01)
    *G16H 20/40*      (2018.01)
    *G16H 30/40*      (2018.01)
    *G16H 50/20*      (2018.01)

(52) U.S. Cl.
    CPC ................ *G06N 3/08* (2013.01); *G06T 3/40* (2013.01); *G16H 20/40* (2018.01); *G16H 30/40* (2018.01); *G16H 50/20* (2018.01)

(58) Field of Classification Search
CPC ....... A61B 5/743; A61B 8/12; A61B 5/02007; A61B 5/02158; A61B 3/0025; A61B 3/14; A61B 5/0084; A61B 5/7475; A61B 3/10; A61B 5/0215; A61B 5/7445; A61B 5/4848; A61B 5/7435; A61B 8/0891; A61B 5/0013; A61B 5/0073; A61B 8/467; A61B 8/4416; A61B 34/10; A61B 5/055; A61B 5/7264; A61B 2034/104; A61B 2034/107; A61B 5/026; A61B 5/6852; A61B 8/463; A61B 5/0077; A61B 5/0035; A61B 5/0059; A61B 5/1076; A61B 6/4417; A61B 2090/3735; A61B 2560/0437; A61B 2560/0487; A61B 5/0095; A61B 5/7275; A61B 5/7425; A61B 6/032; A61B 6/56; A61B 8/04; A61B 8/56; A61B 8/565; A61B 90/37; A61B 3/024; A61B 3/1241; A61B 5/004; A61B 6/037; A61B 6/461; A61B 6/463; A61B 6/505; A61B 8/10; A61B 2034/105; A61B 2576/023; A61B 3/1025; A61B 6/5247; A61B 6/583; A61B 8/06; A61B 8/468; A61B 17/22; A61B 2034/101; A61B 2090/364; A61B 3/028; A61B 5/398; A61B 5/7267; A61B 5/0022; A61B 5/0075; A61B 5/6851; A61B 5/7246; A61B 6/467; A61B 6/503; A61B 88/0883; A61B 17/3421; A61B 2017/0641; A61B 2034/102; A61B 2034/108; A61B 2090/3782; A61B 2503/40; A61B 3/1233; A61B 5/002; A61B 5/01; A61B 5/02055; A61B 5/4064; A61B 5/7257; A61B 5/745; A61B 6/03; A61B 6/4423; A61B 6/508; A61B 6/563; A61B 8/4477; A61B 8/4483; A61B 8/5223; A61B 1/247; A61B 2090/365; A61B 2576/02; A61B 3/0041; A61B 3/0058; A61B 3/1225; A61B 5/0044; A61B 5/4058; A61B 5/4088; A61B 5/4528; A61B 5/6876; A61B 6/12; A61B 6/469; A61B 6/506; A61B 8/445; A61B 1/24; A61B 2034/2051; A61B 2034/2055; A61B 2034/252; A61B 2034/256; A61B 2090/103; A61B 2090/363; A61B 2090/374; A61B 2090/3762; A61B 2090/378; A61B 2090/571; A61B 2576/026; A61B 3/16; A61B 3/165; A61B 34/20; A61B 34/25; A61B 5/0042; A61B 5/0088; A61B 5/0261; A61B 5/064; A61B 5/6853; A61B 90/50; A61B 1/00022; A61B 1/00087; A61B 1/00096; A61B 1/00101; A61B 1/0019; A61B 1/05; A61B 1/051; A61B 1/053; A61B 1/0684; A61B 17/0644; A61B 17/115; A61B 17/320016; A61B 17/3201; A61B 17/3207; A61B 2017/320052; A61B 2017/320056; A61B 2017/320716; A61B 3/0016; A61B 3/0091; A61B 3/032; A61B 5/0205; A61B 5/021; A61B 5/031; A61B 5/061; A61B 5/1075; A61B 5/1077; A61B 5/4041; A61B 5/4076; A61B 5/4082; A61B 5/415; A61B 5/418; A61B 5/4244; A61B 5/4509; A61B 5/4875; A61B 5/742; A61B 6/481; A61B 8/14; A61B 8/5261; A61B 90/36; A61B 90/361; A61B 1/00172; A61B 17/00491; A61B 17/0469; A61B 17/0686; A61B 17/11; A61B 18/1492; A61B 2017/00207; A61B 2017/00893; A61B 2017/06028; A61B 2018/0016; A61B 2018/0022; A61B 2018/00267; A61B 2018/00404; A61B 2018/00511; A61B 2018/00577; A61B 2018/00839; A61B 2018/00875; A61B 2018/0088; A61B 2090/064; A61B 3/00; A61B 3/0008; A61B 3/0033; A61B 3/066; A61B 3/1005; A61B 3/113; A61B 3/13; A61B 3/152; A61B 5/00; A61B 5/0048; A61B 5/0068; A61B 5/0082; A61B 5/0091; A61B 5/02108; A61B 5/024; A61B 5/02405; A61B 5/02416; A61B 5/02427; A61B 5/02433; A61B 5/0245; A61B 5/0531; A61B 5/08; A61B 5/1072; A61B 5/1079; A61B 5/11; A61B 5/1176; A61B 5/14532; A61B 5/1455; A61B 5/14551; A61B 5/14555; A61B 5/16; A61B 5/163; A61B 5/165; A61B 5/201; A61B 5/24; A61B 5/318; A61B 5/349; A61B 5/389; A61B 5/416; A61B 5/42; A61B 5/441; A61B 5/4504; A61B 5/4514; 5/4824; A61B 5/486; A61B 5/4872; A61B 5/685; A61B 5/6898; A61B 5/7203; A61B 5/7207; A61B 5/7221; A61B 5/7225; A61B 5/7235; A61B 5/7239; A61B 5/7278; A61B 5/7282; A61B 6/00; A61B 6/466; A61B 6/52; A61B 6/5205; A61B 6/5217; A61B 8/00; A61B 8/08; A61B 8/0816; A61B 8/0875; A61B 8/4427; A61B 8/4444; A61B 8/485; A61B 8/488; A61B 8/52; A61B 8/587; A61B 90/06; G06T 2207/30041; G06T 2207/10101; G06T 7/0012; G06T 7/0014; G06T 7/12; G06T 1/00; G06T 2207/20081; G06T 2207/20084; G06T 2207/20036; G06T 2207/10048; G06T 7/30; G06T 2207/30101; G06T 7/11; G06T 2207/10064; G06T 11/006; G06T 2207/10116; G06T 7/248; G06T 7/62; G06T 2207/30036; G06T 7/0016; G06T 7/80; G06T 2200/24; G06T 2207/20104; G06T 2207/30008; G06T 2207/30048; G06T 2207/30104; G06T 7/13; G06T 2207/30016; G06T 3/40; G06T 7/00;

G06T 7/136; G06T 7/73; G06T 11/003;
G06T 19/00; G06T 2207/10016; G06T
2207/10056; G06T 2207/10081; G06T
2207/10088; G06T 2207/10132; G06T
2207/20072; G06T 2207/20076; G06T
2207/20224; G06T 2207/30021; G06T
2210/41; G06T 5/002; G06T 5/20; G06T
5/40; G06T 5/50; G06T 7/10; G06T
7/162; G06T 7/20; G06T 7/215; G06T
7/32; G06T 11/001; G06T 2200/04; G06T
2207/10068; G06T 2207/10104; G06T
2207/10108; G06T 2207/10152; G06T
2207/20101; G06T 2207/20182; G06T
2207/30028; G06T 2207/30088; G06T
2207/30096; G06T 2207/30168; G06T
7/149; G06T 7/174; G06T 7/33; G06T
7/41; G06T 7/60; G06T 7/66; G06T 7/70;
G16H 50/50; G16H 30/40; G16H 30/20;
G16H 50/20; G16H 40/63; G16H 20/40;
G16H 10/60; G16H 50/70; G16H 20/30;
G16H 40/20; G16H 50/30; G16H 20/10;
G16H 50/80; G16H 10/40; G16H 30/00;
G16H 70/20; G16H 10/20; G16H 20/17;
G16H 20/70; G16H 40/67; G16H 80/00

See application file for complete search history.

(56) References Cited

U.S. PATENT DOCUMENTS

| | | |
|---|---|---|
| 7,783,337 B2 | 8/2010 | Feldman et al. |
| 7,787,127 B2 | 8/2010 | Galle et al. |
| 7,995,210 B2 | 8/2011 | Tearney et al. |
| 7,999,938 B2 | 8/2011 | Wang |
| 8,108,030 B2 | 1/2012 | Castella et al. |
| 2006/0241503 A1 | 10/2006 | Schmitt et al. |
| 2008/0180683 A1 | 7/2008 | Kemp |
| 2008/0291463 A1 | 11/2008 | Milner et al. |
| 2009/0043191 A1 | 2/2009 | Castella et al. |
| 2010/0220334 A1 | 9/2010 | Condit et al. |
| 2011/0152771 A1 | 6/2011 | Milner et al. |
| 2014/0119624 A1 | 5/2014 | Ehlers et al. |
| 2016/0174830 A1* | 6/2016 | Rubin ............... A61B 3/102 |
| | | 351/246 |
| 2016/0242638 A1 | 8/2016 | Durbin et al. |
| 2017/0258321 A1 | 9/2017 | Dastmalchi et al. |
| 2018/0001184 A1* | 1/2018 | Tran ............... G16H 50/20 |

\* cited by examiner

| Layer | Input | Size | Stride | Padding | Regularization | Activation | Output | No. parameters |
|---|---|---|---|---|---|---|---|---|
| Conv1 | 224x224 | 5x5x32 | 1 | Valid | L2 (l=1E-3) | ReLU | 220x220x32 | 832 |
| Maxpool1 | 220x220x32 | 2x2 | 1 | - | - | - | 110x110x32 | 0 |
| Conv2 | 110x110x32 | 5x5x64 | 1 | Valid | L2 (l=1E-3) | ReLU | 106x106x64 | 51,264 |
| MaxPool2 | 106x106x64 | 2x2 | 1 | - | - | - | 53x53x64 | 0 |
| Dropout1(45%) | - | - | - | - | - | - | - | 0 |
| Conv3 | 53x53x64 | 5x5x128 | 1 | Valid | L2 (l=1E-3) | ReLU | 49x49x128 | 204,928 |
| MaxPool3 | 49x49x128 | 3x3 | 1 | - | - | - | 16x16x128 | 0 |
| Dropout2(45%) | - | - | - | - | - | - | - | 0 |
| Flatten1 | 16x16x128 | - | - | - | - | - | 32768x1 | 0 |
| Dense1 | 32768x1 | - | - | - | maxnorm(m=2) | ReLU | 64x1 | 2,097,216 |
| BatchNorm1 | 64x1 | - | - | - | - | - | 64x1 | 256 |
| Dropout3(45%) | - | - | - | - | - | - | - | 0 |
| Dense2 | 64x1 | - | - | - | maxnorm(m=2) | ReLU | 16x1 | 1,040 |
| BatchNorm2 | 16x1 | - | - | - | - | - | 16x1 | 64 |
| Dropout4(45%) | - | - | - | - | - | - | - | 0 |
| Dense3 | 16x1 | - | - | - | - | Softmax | 2x1 | 34 |

FIG. 22

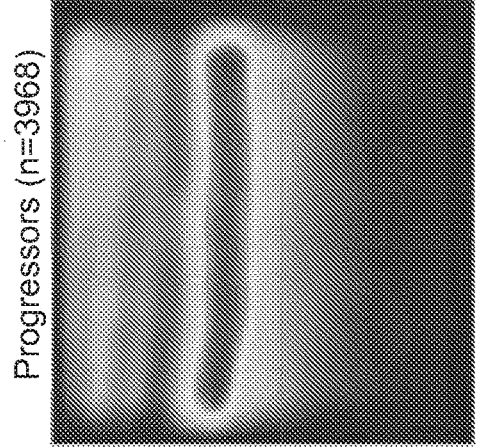
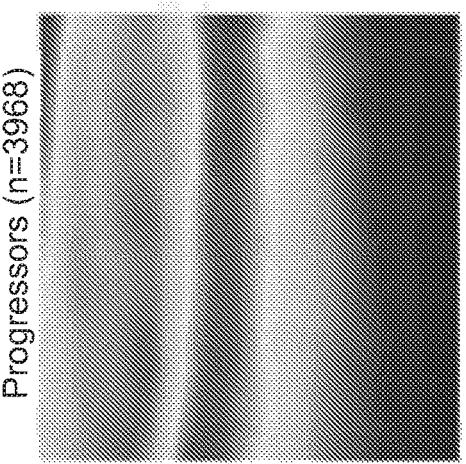
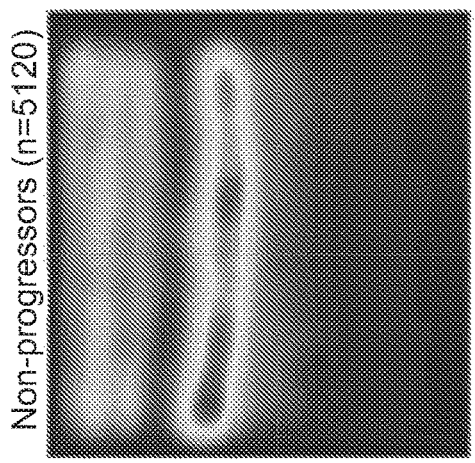
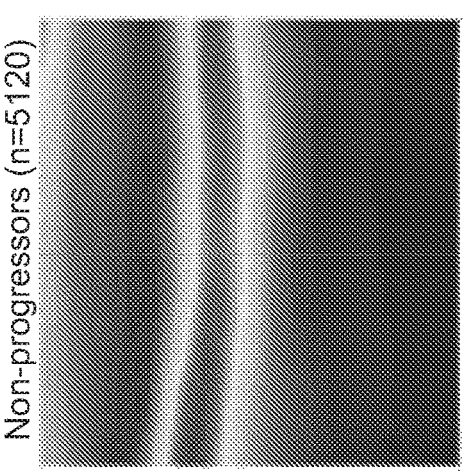
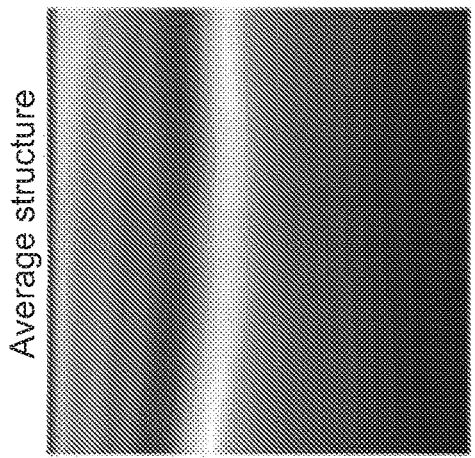
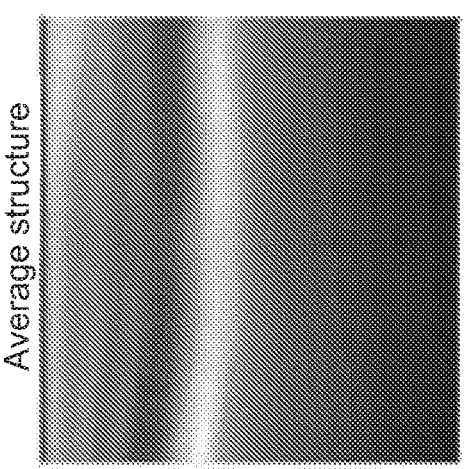
FIG. 25
FIG. 26

METHOD AND SYSTEM FOR DISEASE ANALYSIS AND INTERPRETATION

RELATED APPLICATIONS

This application is a national stage entry of PCT/US2019/029160, filed Apr. 25, 2019, which claims the benefit of and priority to U.S. Provisional Application Ser. No. 62/663,180, filed Apr. 26, 2018, the contents of which are incorporated by reference in their entirety.

TECHNICAL FIELD

The present application relates to methods of analyzing optical coherence tomography images of a retina to assess disease status and prognosis.

BACKGROUND

Many diseases manifest themselves through changes in retinal health. In that manner, diseases that affect tissues in the eye can be diagnosed using optical coherence tomography (OCT) imaging. OCT image data is the standard of care for imaging the retina and assessing the the health of the eye. An OCT scanner creates depth-resolved image data that can reveal near-cellular detail. The axial resolution of most scanners is in a range of the order of 5 microns, which renders various retinal layers visible, allowing them to be measured accurately. Some ocular pathologies can be diagnosed based on the thicknesses of retinal layers or based on morphological changes seen in the OCT images.

As with many diseases, early detection is important for positive clinical outcomes. But deviations from a normal retina may not become recognizable using traditional methods of analyzing an OCT image until the disease has already progressed significantly. For example, structural changes within layers may occur at the cellular level preceding any measurable thickness and morphological changes. These subclinical changes may go unnoticed, causing delays in diagnosis and potentially impeding treatment options.

One exemplary disease that can be assessed by analyzing a retina is age-related macular degeneration (AMD), which is a leading cause of vision loss for people over 50 and accounts for 8.7% of all blindness worldwide. AMD proceeds in distinct stages from early, to intermediate, to advanced. In advanced, wet (neovascular) AMD, blood vessel growth (choroidal neovascularization, or CNV) can lead to irreversible damage to the photoreceptors and rapid vision loss. However, patients can progress to wet AMD without symptoms or any measurable change observed in traditional OCT analysis. Thus it is difficult to identify patients who are at risk for conversion to wet AMD, which would allow intervention before permanent damage.

Another example is multiple sclerosis (MS), which is a disease marked by damages to the myelin coating around nerve fibers which interferes with transmission of nerve signals in the central nervous system. In MS, the disease progresses through various states of relapse remitting MS (RRMS), primary and secondary progressive, and progressive relapsing. Inner nuclear layer (INL) thickness, a neuronal layer of the retina that is visible with OCT, is predictive of disease progression. But like with AMD, by the time deviations from a normal retina are visible, the disease has already progressed.

With these and other diseases of the retina, earlier detection would offer more effective treatment options.

SUMMARY

The present invention provides new ways of analyzing OCT data that predicts the progression of disease development in the retina, providing the potential for earlier diagnosis of disease than was previously available with traditional OCT analysis. Methods of the invention analyze image data of the retina to assess disease status and/or progression, and also predict, in a localized way, how that disease status may change. The methods take 2D or 3D OCT data derived from different light source configurations, such as swept-source and spectral domain, and analyze it with neural networks that are trained on OCT images correlated with known clinical outcomes to identify intensity distributions or patterns indicative of different retina conditions. The methods have greater predictive power than traditional OCT analysis because the invention recognizes that subclinical physical changes affect how light interacts with the tissue matter of the retina, and these intensity changes in the image can be distinguishable by a neural network that has been trained on imaging data of retinas. A computer can thus assess the distribution of the image intensities to estimate the current health and also provide a prognosis. The methods can classify healthy retinas, retinas undergoing structural changes, and pathological retinas, providing a score indicative of health and prognosis.

In that manner, methods of the invention provide ways to assess a likelihood of disease development and or progression in a subject. The methods involve receiving OCT data of a subject; processing, via a computer, the OCT data of the subject to extract one or more features in the OCT data that are descriptive of a disease state; and based on the disease state shown in the processed OCT data, making a prognostic measurement on the likelihood of disease development in the subject.

In some embodiments, the OCT data comprises B-scan data. The B-scans may be preprocessed using layer segmentation to identify one or more interfaces in the retina. The B-scans may be cropped and resampled to a uniform size. The uniform size may be based on one or more segmented layers. In embodiments, prior to training the OCT data is preprocessed by cropping or scaling an image. The one or more features in the OCT data may include spatial patterns intensities. The data may be preprocessed by cropping or scaling an image. The OCT data may be supplemented with layer position information. In embodiments, the computer has been trained on a set of OCT data to correlate the spatial patterns with clinical outcomes. The training may involve analyzing the spatial patterns using a neural network, such as a convolutional neural network or a recurrent neural network. In some embodiments, the neural network comprises one or more convolutional layers. The spatial patterns may be indicative or predictive of retinas that are healthy, pathological, or undergoing change.

In some embodiments, the change is indicative or predictive of choroidal neovascularization. The change may be a change at a cellular level on the choroid, which may or may not have yet undergone structural change. The disease state may represent a deviation from normal. The disease development analyzed may include progression from dry to advanced age-related macular degeneration (AMD). In other embodiments the disease is glaucoma. In other embodiments the disease is multiple sclerosis, and the disease progression involves progression from relapse remitting multiple sclerosis, primary progressive multiple sclerosis, secondary progressive multiple sclerosis, and progressive relapsing multiple sclerosis. In those embodiments the change may involve intensity variations only, or indeed be a change to the measurable thickness of the inner nuclear layer of the retina.

In some embodiments, the method further involves making a recommendation for treatment based on the prognostic measurement and/or providing a localized treatment to an area comprising the change. The localized treatment may include anti-VEGF, stem cells, or targeted laser interventions.

In other aspects, the disclosure provides methods for assessing development or progression of a disease in a subject. The method includes accepting as input, OCT data representative of a retina of a subject. The method further includes analyzing the input data using a prognosis predictor correlated with a likelihood of development or progression of a disease that is diagnosable through retina analysis, wherein the prognosis predictor was generated by: obtaining OCT training retinal data from a plurality of subjects having different stages of the disease and known development or progression outcomes; and training the prognosis predictor using the OCT training retinal data, without resizing the OCT training retinal data of any individual, to determine intensity distributions and/or patterns in the OCT training retinal data that are indicative of healthy retinas, retinas undergoing change, and retinas showing a pathological indication that a subject has the disease. The method additionally includes providing a score indicative of present retinal health of the subject and a likelihood of the disease developing or progressing in the subject as a result of using the prognosis predictor on the input data.

In some embodiments, the training involves analyzing the intensity distributions and/or patterns using a neural network, such as a recurrent neural network or a convolutional neural network having one or more convolutional layers. The intensity distributions and/or patterns may be indicative of a textural change at a cellular level, such as a change is indicative of choroidal neovascularization or geographic atrophy. The methods may further involve making a recommendation for treatment based on the score and/or providing a localized treatment based on intensity distributions or patterns in the OCT data of the subject.

In other aspects, the invention provides a method for monitoring a disease status of a subject over time. The method includes receiving a first set of OCT data from a first OCT instrument in a first format and processing the first set of OCT data in the first format to generate a first OCT image in a third format that comprises a first summary parameter at a first location in the first OCT image. The method further includes receiving a second set of OCT data from a second OCT instrument in a second format and processing the second set of OCT data in the second format to generate a second OCT image in the third format that comprises a second summary parameter at a second location in the second OCT image. The method then involves compensating for a different position of the first summary parameter at the first location in the first OCT image and the second summary parameter at the second location in the second OCT image, and comparing the first summary parameter at the first location in the first OCT image to the second summary parameter at the second location in the second OCT image, thereby monitoring a disease status of a subject over time.

In some embodiments, the processing steps involve segmenting the OCT data to identify anatomical landmarks of the subject. The summary parameters may for example be retinal thickness. The processing steps may include analyzing flow measurements using OCT angiography. The compensating step may include image registration of the first and second OCT images. Image registration may include affine transformation, linear transformation, rigid transformation, non-rigid transformation, or a deformable transformation. The OCT data may be from ophthalmic imaging of the subject, such as images of the subject's retina, and the anatomical landmarks may include one or more of the following: retinal layer interfaces, fluid pockets, and areas of atrophy. In some embodiments, the first OCT instrument is different from the second OCT instrument, such as where the first and second OCT instruments are from different manufacturers.

BRIEF DESCRIPTION OF THE DRAWINGS

FIG. 22 shows a table with a detailed breakdown of the architecture of AMDnet.

FIGS. 25-26 show results of a feature analysis of the retina.

DETAILED DESCRIPTION

Figure 1:
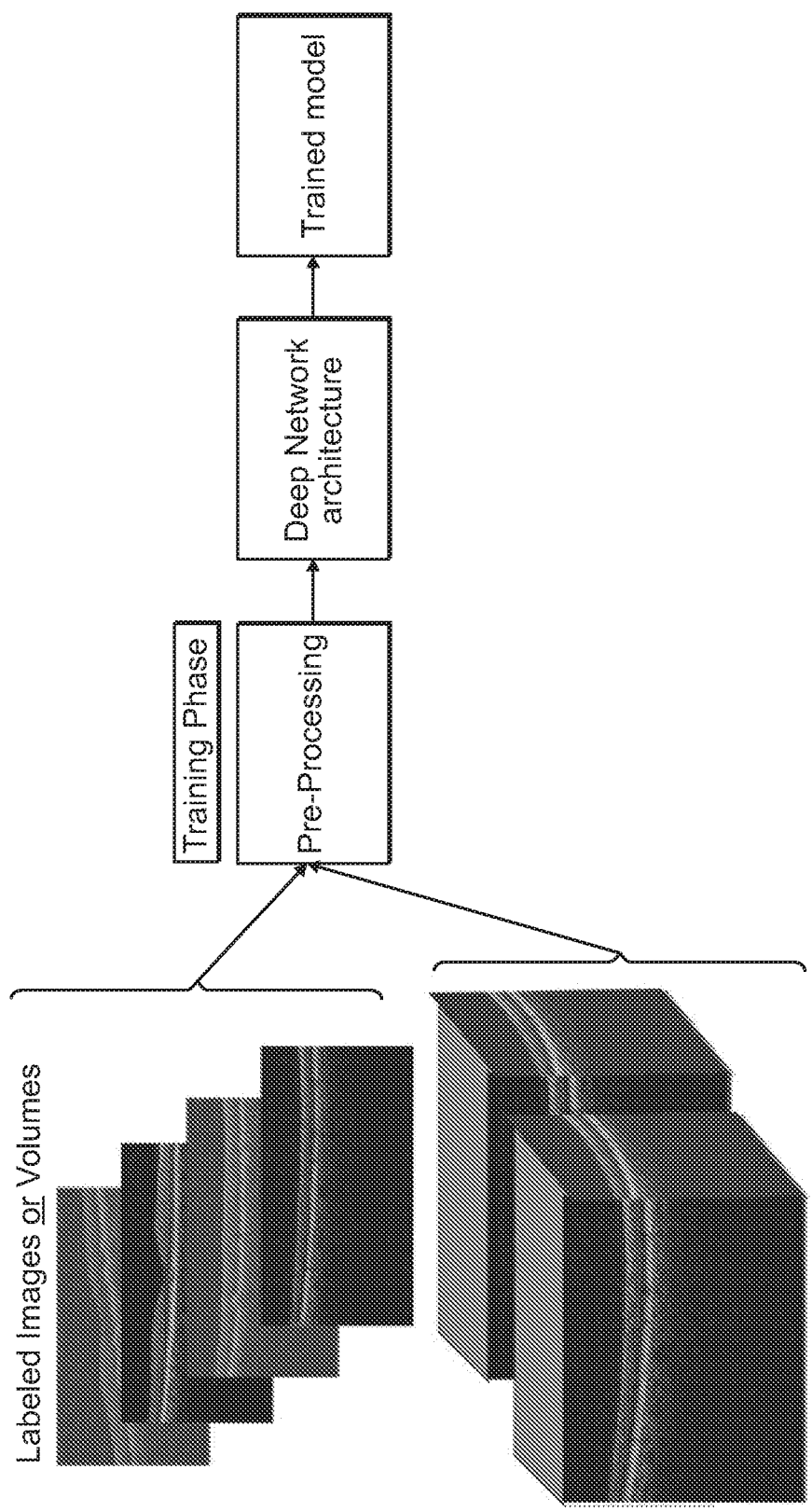
FIG. 1 shows an overview of the training phases that creates the system.

Ocular and other pathologies can be assessed based on morphological markers in the retina, which are observable with optical coherence tomography (OCT) imaging. The present disclosure describes methods for analyzing OCT data to provide earlier and more accurate assessments and prognoses of retinal health, as well as standardized assessments over time and across different imaging apparatuses. To do so, OCT-based biomarkers are derived from a deep learning classifier trained on OCT data from subjects with known outcomes to help predict whether patients have a condition or are likely to develop one. Using methods of the invention, computers analyze OCT imaging data to draw conclusions about health and prognosis that are more accurate and more predictive than traditional OCT analysis methods.

In a particular example that will be discussed throughout the application, the methods are useful for assessing age-related macular degeneration (AMD) in a patient, and determining whether the patient will develop the disease, or will progress from early/intermediate AMD to advanced AMD. Although the present disclosure describes the use of the disclosed methods with respect to AMD in particular, methods of the disclosure offer subclinical assessment of a variety of pathologies that manifest themselves in the retina. It should be understood that any disease involving changes to the retina can be assessed with the pattern recognition methods of the invention, including diseases that are not strictly ocular diseases.

One of the major challenges in the clinical management of patients with early/intermediate AMD is the assessment of risk of conversion. Structural OCT data have been used to create anatomical biomarkers such as thickness and volumetric measures, but compelling indicators of conversion have yet to emerge. Traditionally OCT analysis involves observing recognizable structures, such as the inner and outer retinal boundaries, and measuring the thickness in between. Some methods involve observing the volume, height, and reflectivity of drusen, or the thinning and loss of reflectivity of the inner/outer segment junction. A thinning choroid could be indicative of loss of blood flow, whereas thickening could be too much blood flow which leads to wet AMD, the degree of which may indeed be measured using total retinal thickness. Neovascularization is typically diagnosed based on signs of exudation, seen either by fundus examination and confirmed using fluorescein angiography or by visualizing fluid pockets seen cross-sectionally using depth resolved OCT images; such fluid pockets having the effect of thickening the retina.

There has been some use of OCT angiography (OCTA) to observe subclinical neovascularization, but this is not widely used, there is little to no consensus of how to assess metrics across devices, and longitudinal data is less readily available. For many ocular diseases, including glaucoma, as well as diseases of the central nervous system such as multiple sclerosis, only structural parameters pertaining to thicknesses and morphology are routinely considered and used for disease diagnosis and prognosis. Indeed, prognosis is rarely done and image texture is not commonly used.

To improve OCT analysis of these and other diseases, the methods disclosed herein involve advanced feature extractors and classifiers facilitated through deep learning to mine OCT data sets for signals that support a subclinical assessment of non-exudative neovascularization. Deep learning is excellent at recognizing and understanding textural patterns, tasks humans are not good at. With computer aided learning systems it is possible to look at intensity patterns, rather than merely observing structure. The intensity patterns may not be obvious structural changes, but are potentially indicative of change at a cellular level. Intensity change results from the way the light passes through the tissue, meaning that intensity changes may be indicative of structural change at some level, but these changes would be imperceptible or unidentifiable without a computer. These changes may for example be indicative of early, subclinical, or clinical choroidal neovascularization (CNV). In some embodiments, the intensity distributions in the data are converted into risk scores.

Additionally, the activation maps derived from the present invention offer positional information that may support localized treatment. For example, to manage wet-AMD anti-vegf injections are used. By identifying more precise localized information, treatment could be more targeted and implemented with lower doses. Various methods of laser-based photocoagulation have also been used for stopping the blood leakage, and these could be guided with greater precision. Stem cells treatment is another possibility, and the present disclosure would allow these implants to be more targeted.

Methods of the invention rely on OCT imaging data. In exemplary embodiments, the invention provides systems for capturing three dimensional images by OCT. Commercially available OCT systems are employed in diverse applications including diagnostic medicine, e.g., ophthalmology. OCT systems and methods are described in U.S. Pub. 2011/0152771; U.S. Pub. 2010/0220334; U.S. Pub. 2009/0043191; U.S. Pub. 2008/0291463; and U.S. Pub. 2008/0180683, the contents of each of which are hereby incorporated by reference in their entirety.

In certain embodiments, an OCT system includes a light source that delivers a beam of light to an imaging device to image target tissue. Within the light source is an optical amplifier and a tunable filter that allows a user to select a wavelength of light to be amplified. Wavelengths commonly used in medical applications include near-infrared light, for example between about 800 nm and about 1700 nm. OCT systems can also operate with other light sources such as, for example, a pulsed laser as described in U.S. Pat. No. 8,108,030, the contents of which are hereby incorporated by reference in their entirety.

Generally, there are two types of OCT systems, common beam path systems and differential beam path systems, which differ from each other based upon the optical layout of the systems. A common beam path system sends all produced light through a single optical fiber to generate a reference signal and a sample signal whereas a differential beam path system splits the produced light such that a portion of the light is directed to the sample and the other portion is directed to a reference surface. Common beam path systems are described in U.S. Pat. Nos. 7,999,938; 7,995,210; and 7,787,127 and differential beam path systems are described in U.S. Pat. Nos. 7,783,337; 6,134,003; 6,421,164; and U.S. Pub. 2006/0241503, the contents of each of which are incorporated by reference herein in its entirety.

While OCT imaging has been widely used in ophthalmology, the methods of the present disclosure combine OCT information with deep learning to detect pathology by analyzing patterns in retinal layers. By learning the features in a systematic way afforded by deep neural networks, the methods provide more robust solutions than typical OCT analysis. Deep neural networks have the ability to learn complex patterns, making textural analysis a feasible diagnostic and prognostic tool. However, the deep learning methods disclosed herein are able to analyze these data more precisely. An OCT image will reflect the structure of the imaged tissue. If, for example, the choriocapillaris undergoes a structural change, light will refract differently and the signal at that point and below will change. This will also be true of changes in the choroid and retinal pigment epithelial layer (RPE). The texture seen in the OCT data will change and noise due to speckle will also be affected. Without deep learning, it would not be feasible to interpret the subtle patterns in the data. Only advanced and well constrained methods of pattern recognition can make sense of these differences.

Learning systems of the present disclosure use localized texture in the OCT data for disease detection and prognosis, where a texture is broadly defined as spatial patterns in the image data (intensities). The data may be averaged or unaveraged, though unaveraged data is preferred because averaging errors can smear detail in the scans, which affects the texture. The methods use a learning system that associates these patterns with a disease state and/or a disease prognosis. The learning system is a supervised system that takes as input labelled images. Two different learned systems may be used: one for health or abnormality score; and another for prognosis, that is, likelihood of developing a disease afflicting the retina. An overview of the training phases that creates the system is given in FIG. 1. The training phases begin with a preprocessing step.

Figure 2:
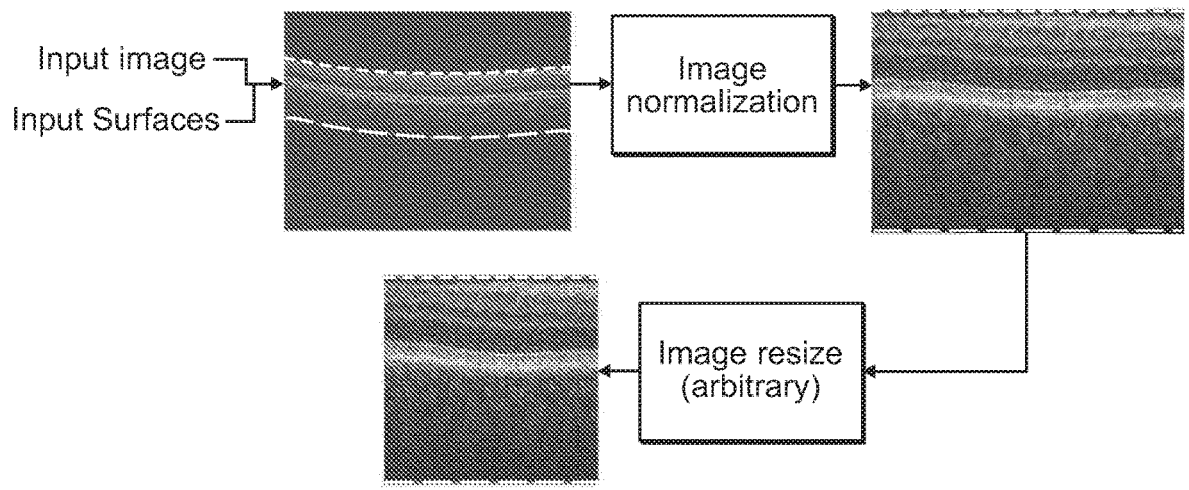
FIGS. 2-3 show preprocessing using 2D and 3D OCT.
Figure 3:
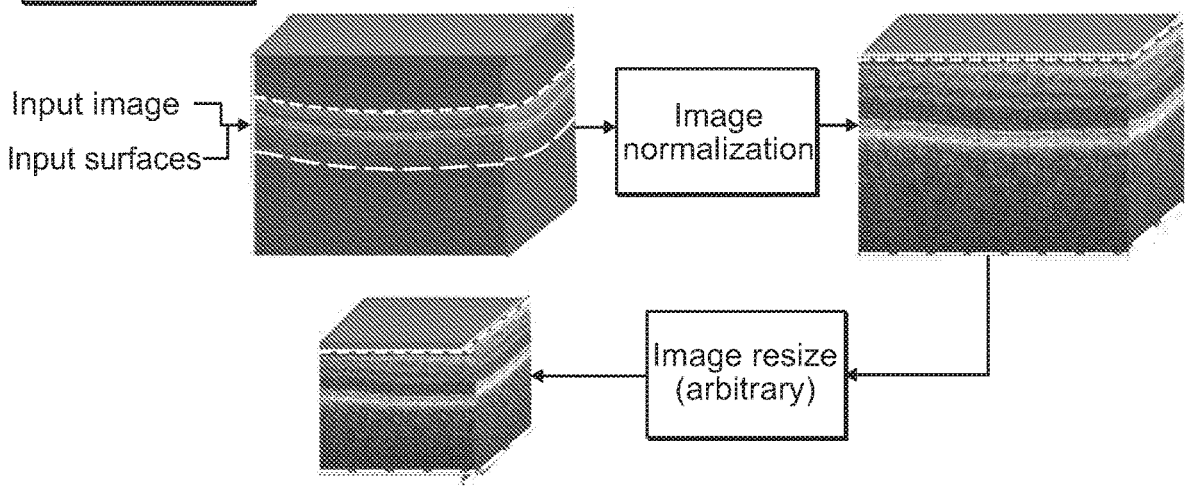

The preprocessing consists of taking the input image data and cropping it to a top and a bottom surface. The surfaces can be linear or nonlinear. This process can be done in 2D on the slices or in 3D on the entire volume, as shown in FIGS. 2 and 3, respectively. This process preserves the relevant areas of the image data and discards the rest, or simply encodes the layer information into the data. This step can be performed using two pre-segmented surfaces, shown in red and magenta in FIGS. 2 and 3. Once this is done, the image data can be in one embodiment be scaled in size to create an image patch of pre-determined, fixed size. This involves taking the original image data (that lying between the red and magenta boundaries), and resizing it to a fixed height. This is then done for all columns (A-scans) in the image, resulting in an image of fixed height. The image can then be resized to whatever dimensions necessary using interpolation. This normalization, or homogenization, approach is a critical first step of the entire processing pipeline. In another embodiment, 3 or more surfaces can be used to normalize an image using the same approach.

As shown in FIG. 2, the size of each 2D image patch is 224×224 pixels. For 3D images, in FIG. 3, the cropped area is 128×128×128 pixels. It should, however be obvious to one skilled in the art, that the size can be arbitrary in any dimension. The individual columns (A-scans) may be resized (upsampled or downsampled as required) using cubic interpolation or any other form of interpolation. This normalization step factors size out of the equation and also discards data that is not relevant to the recognition task. It can also be used to make directly comparable OCT images taken from different scanners with different resolutions.

Figure 4:
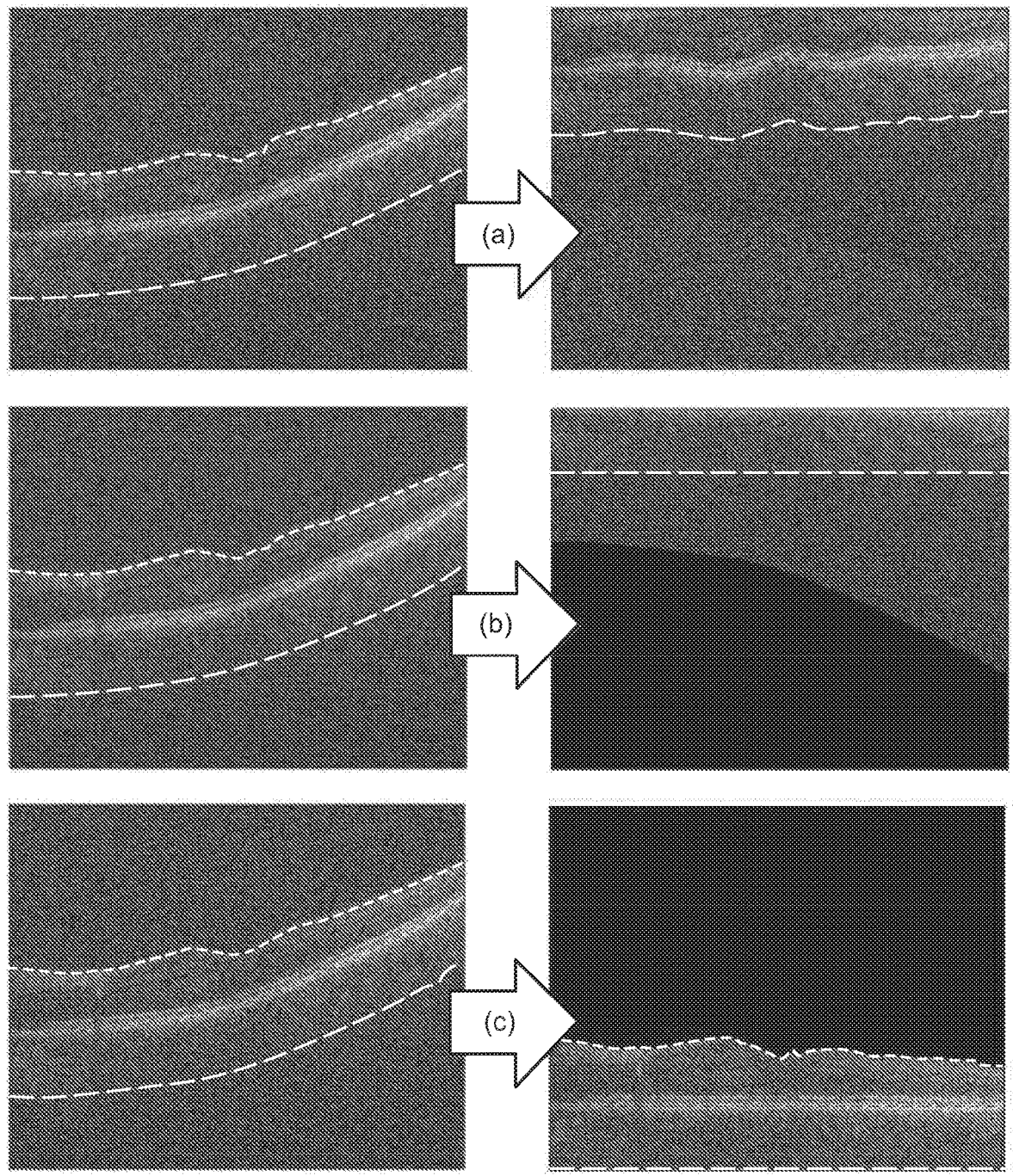
FIG. 4 shows examples of normalization strategies.

Other normalization strategies are also encompassed by the disclosed methods. For example, instead of cropping to a given surface, a circular shift in the direction orthogonal to that surface could be done such that the surface is at a fixed height. This would mean pushing all relevant data to the top of the image, but not discarding any data. Another option to discard data would be to pad with zeros instead of doing a circular shift. FIG. 4 shows examples of these normalization strategies. In the normalization indicated by arrow (a), relevant information is brought by a circular shift, and padded below with the original data. In the second case indicated by arrow (b), the relevant information brought to the top is from a deeper layer, and the padding is with zeros (or any number indicating "no useful data"). One can envisage shifting up or down to a given layer or surface and either wrapping the intensities or padding with zeros (or any other constant). Layer information, which can be non-linear or linear, is used to concentrate information at a common reference point, but in this case no resizing is done. Alternatively, in the case indicated by arrow (c) the data is shifted to make one surface at a constant height and then cropped above an second surface. This factors size back in as a parameter which can be useful. It should be obvious to one skilled in the art that these normalizations can be performed with 2D images and 1d surfaces as shown in FIG. 4, or with 3D volumes and 2D surfaces.

Figure 5:
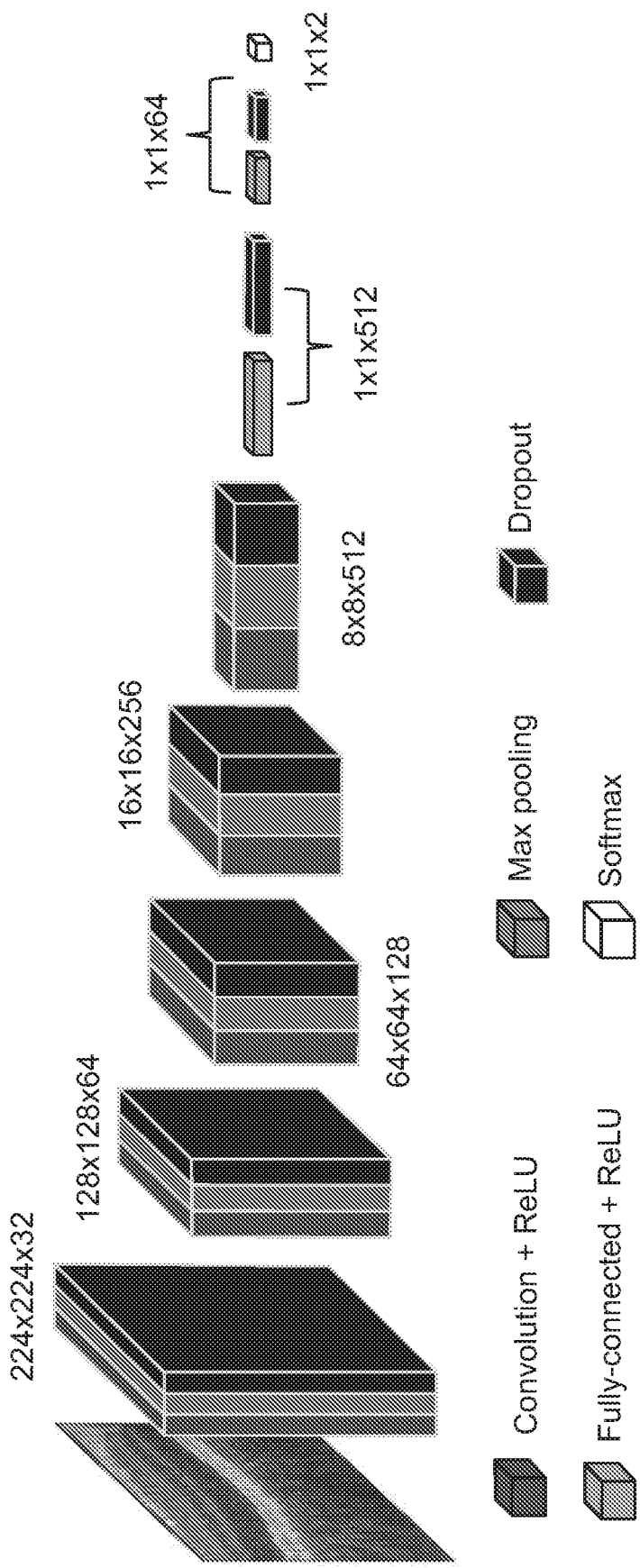
FIG. 5 shows a deep learning architecture for associating normalized image data to labels.

The images and their labels are then fed to a learning system that associates the normalized image data to the labels. FIG. 5 shows a deep learning architecture for this task. In FIG. 5, a deep convolutional neural network architecture provides an output by using a combination of convolution layers, max pooling (sub-sampling), and fully-connected layers along with methods of regularization. Back propagation is used to train the parameters of the architecture. This is a gradient descent approach to minimize the training error in the prediction. It propagates error scores derived at each iteration of the learning process back through the layers of the network, adjusting their parameters accordingly.

The parameters of the convolution layers are trained, therefore, to recognize patterns or textures in the normalized data as their weights are learned to maximize the responses to the data in a positive or negative way. For example, if a network was being trained to learn edges, the convolution layers would essentially learn to be edge filters. They are in general ideal for learning spatial patterns in data in a supervised way.

The fully connected layers are used at the end of the network following all the feature extraction work to consolidate the result as a single prediction. These often use a nonlinear activation function or a softmax activation to output class probabilities, as is done in this example. Drop-out layers are used at various stages to help prevent over-fitting.

Once the deep neural network model is trained, all parameters are fixed and the model may be deployed. This involves presenting new images to the pre-processing step, through normalization and then into the model. The final softmax layer then gives a score in the range 0 to 1, which in this case would mean its association to a given label (1 being highest likelihood, 0 lowest). For a two class problem, we will have two such scores. An overview of the testing/deployment phase is given in FIG. 6.

Figure 6:
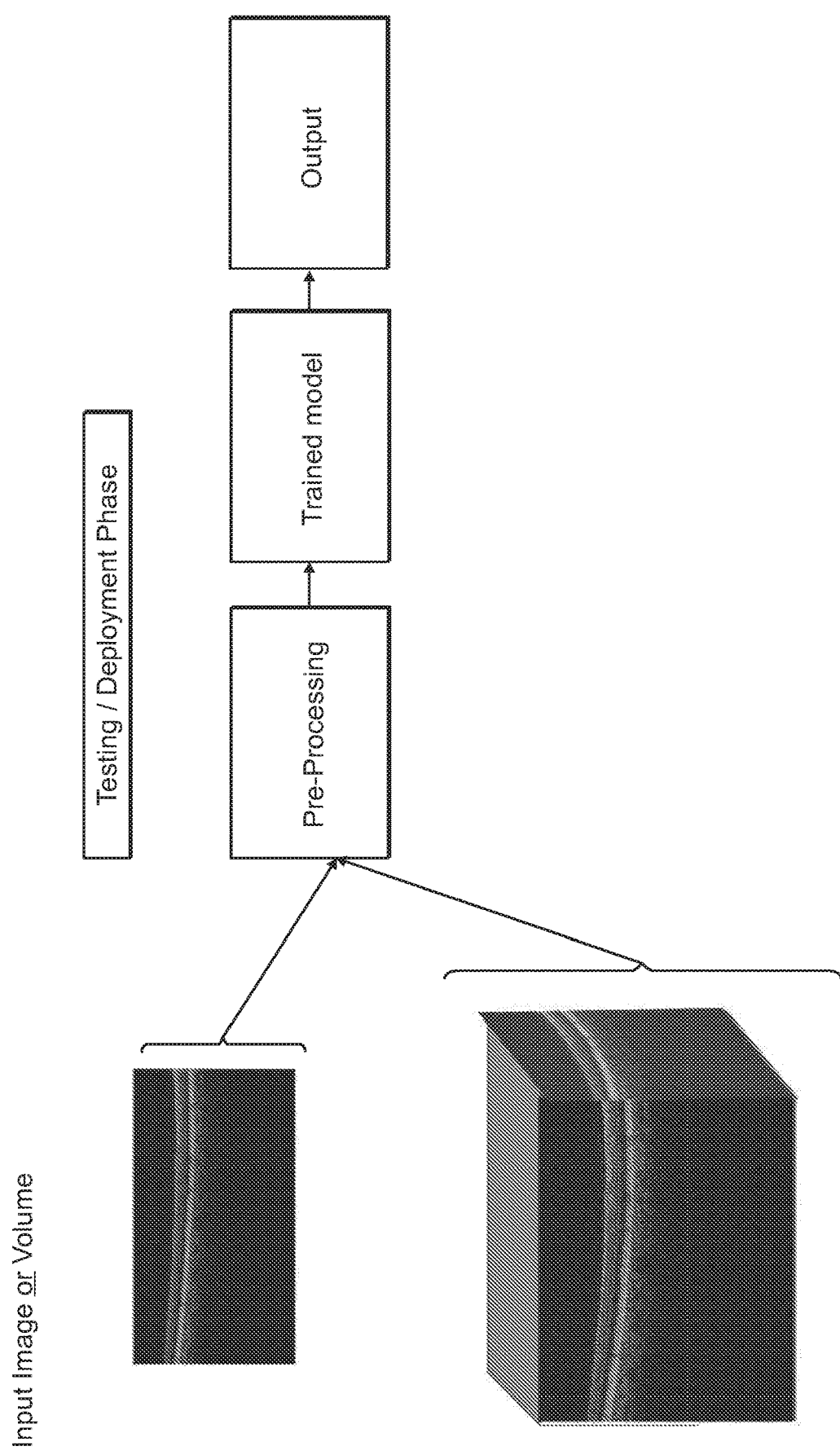
FIG. 6 shows an overview of a testing/deployment step.
Figure 7:
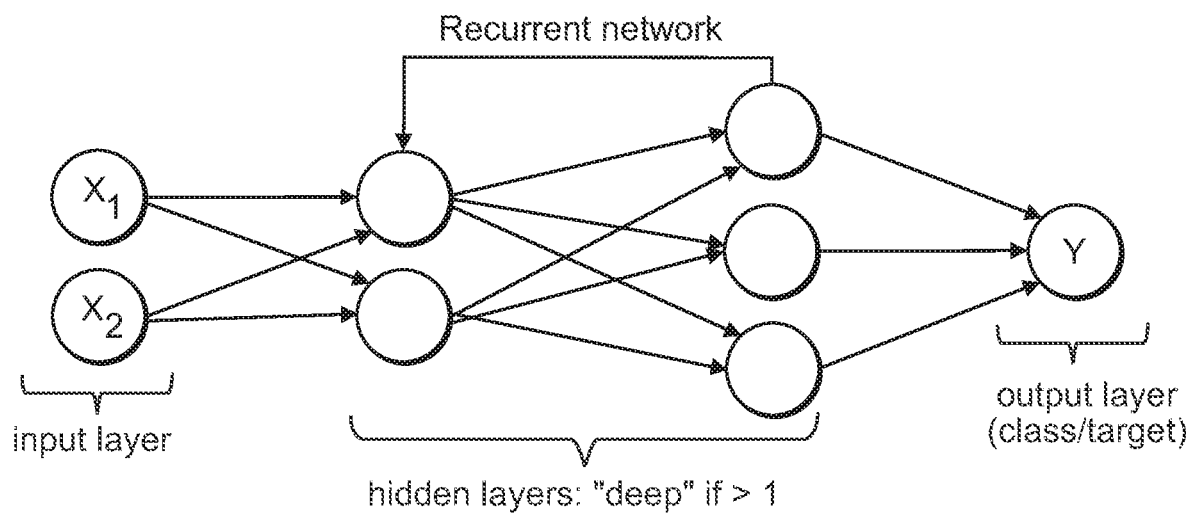
FIGS. 7-8 show an architecture of an RNN.
Figure 8:
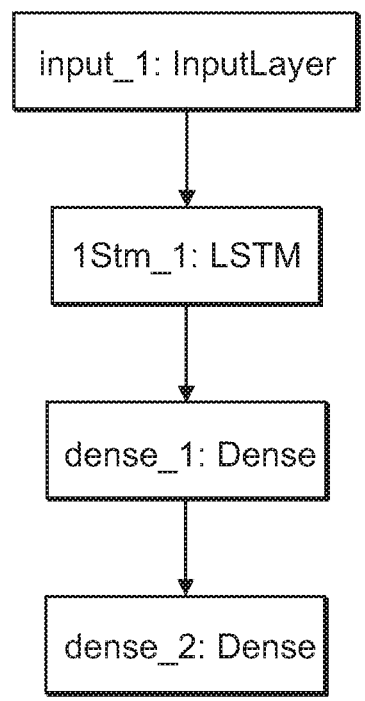
Figure 9:
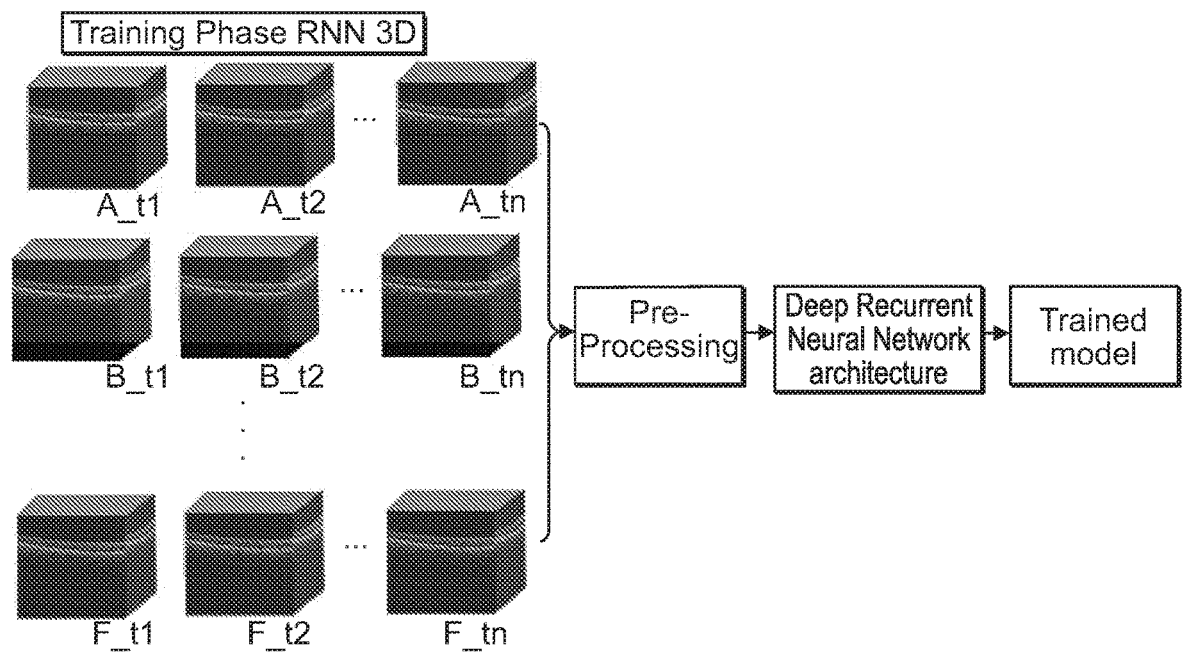
FIGS. 9-12 show training and testing phases using sequences of images taken over time.
Figure 10:
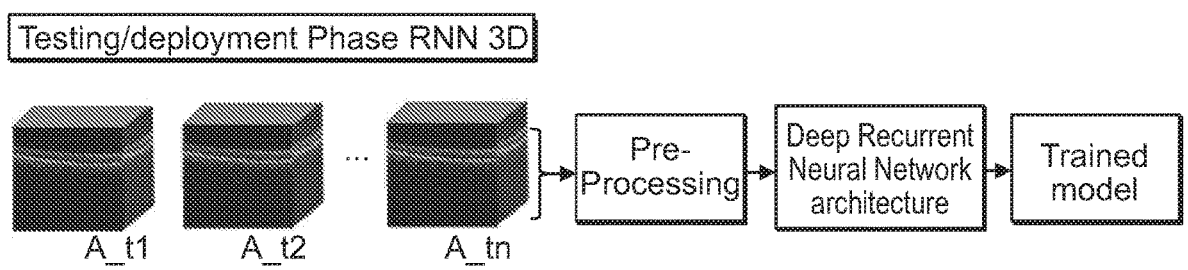
Figure 11:
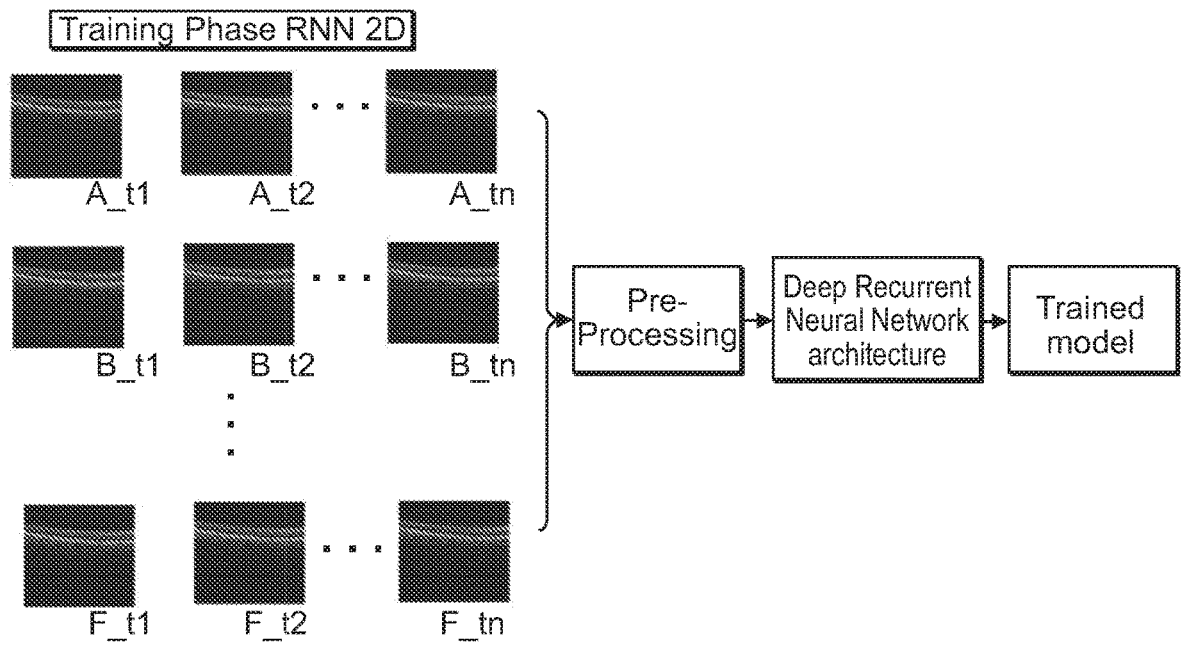
Figure 12:
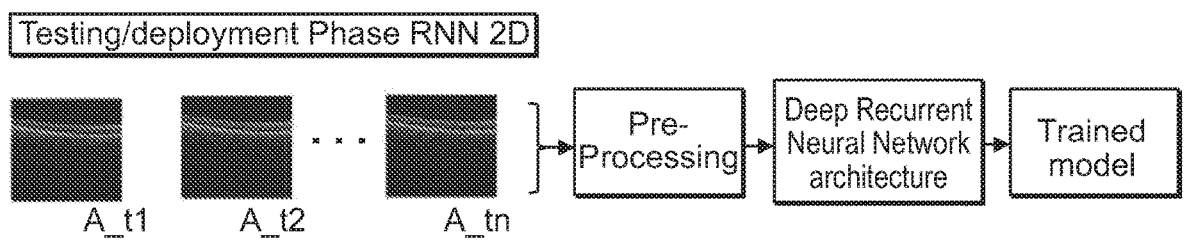

The embodiment described above uses a convolutional neural network which takes a single image as input and generates a one-to-one mapping in the case of image in, label out. Disease, by nature, changes over time, which means that looking at a sequence of images can be better in some cases. For these cases, another embodiment uses a recurrent neural network (RNN) which takes as input a sequence of images (2D or 3D). The training and testing phases proceed as outlined above and are depicted in FIG. 6. The only difference is that (i) the inputs to the training phase are labeled sequences of 2D or 3D images, (ii) the input to the testing phase is a sequence of 2D or 3D images and (iii) the architecture is different. RNN by definition is a many-to-one mapping. So would take, as input, multiple images from the same patient over different times. Embodiments using an RNN learn the textural changes over time and can thus decipher a pattern of change. A general example of an RNN architecture is depicted in FIG. 7, and a specific embodiment of this architecture is shown in FIG. 8. Training and testing phases using sequences of images taken over time and input into an RNN are shown in FIGS. 9 and 10 (for a 3D embodiment) an FIGS. 11 and 12 (for a 2D embodiment). The training and testing proceeds as described above.

Figure 13:
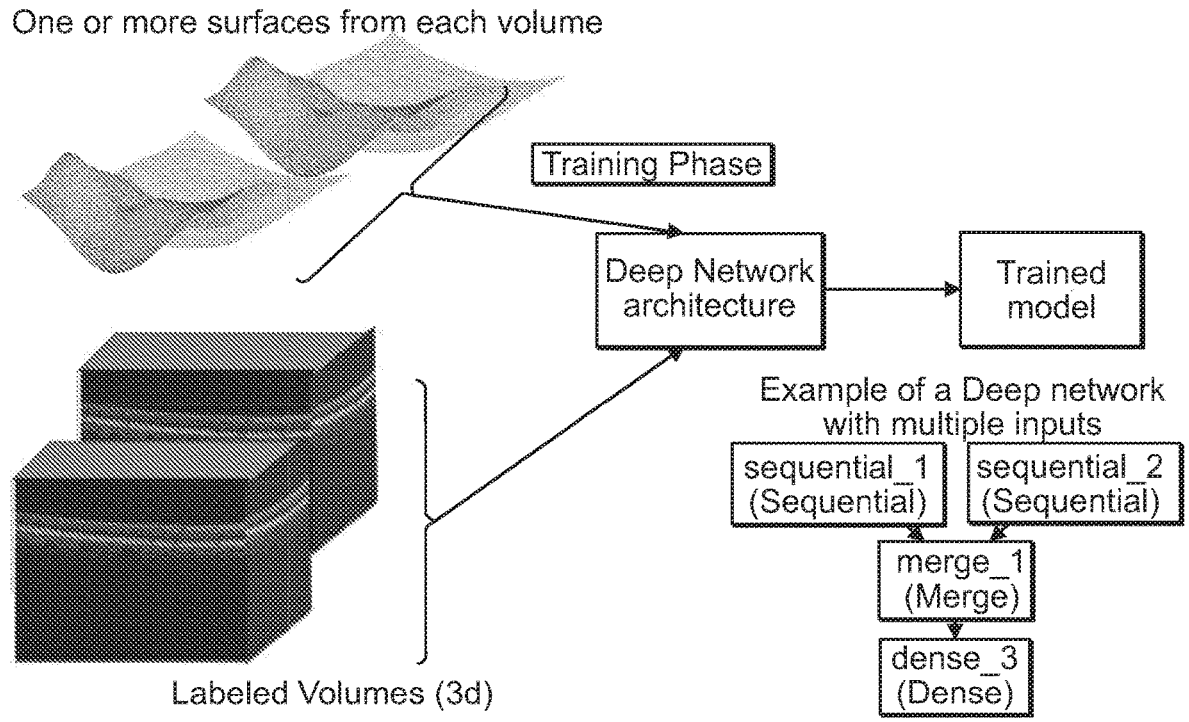
FIGS. 13-14 show an embodiment of an architecture that does not include preprocessing.
Figure 14:
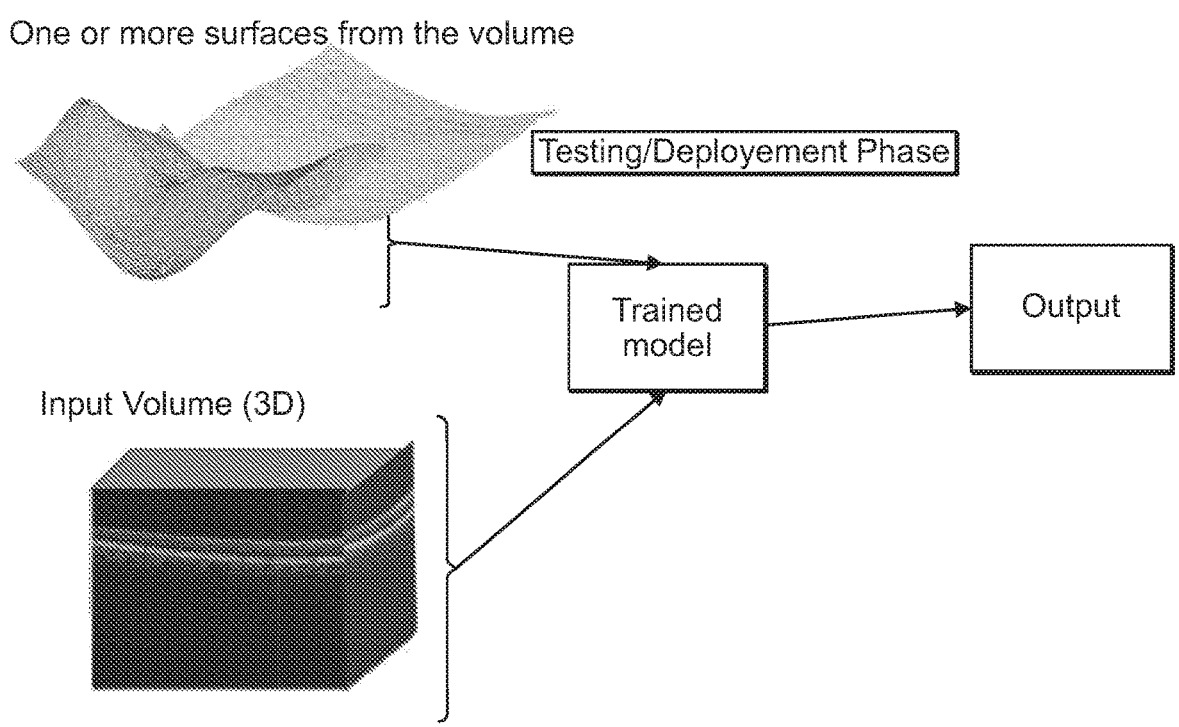

In some embodiments, the preprocessing is not used but information regarding layer positions is included, together with the raw images as a separate input to the neural network. In the embodiment of FIG. 13, one or more surfaces are included as an input to a neural network which can then use that information to help determine the relationship between the images and the labels. This figure depicts the images as 3D volumes with 2D surfaces, but it would be obvious to one skilled in the art to apply this to 2D images with 1D surfaces. The testing phase would proceed as shown in FIG. 14. To realize such an additional input to the neural network, a practical implementation would be to encode the layer positions in the image data that is passed to the network. OCT data is grayscale (single channel), but color (RGB) images use three channels. Most neural network architectures are designed for color image processing, offering three input channels. One could envisage, therefore, using the OCT data in the first channel and encoding the layer information in the remaining two channels; as for example a label or distance map. Or, in another embodiment, the OCT data could be the first channel and the corresponding angiography flow data could be in the other channel, with or without the layer positions as an additional channel.

Figure 15:
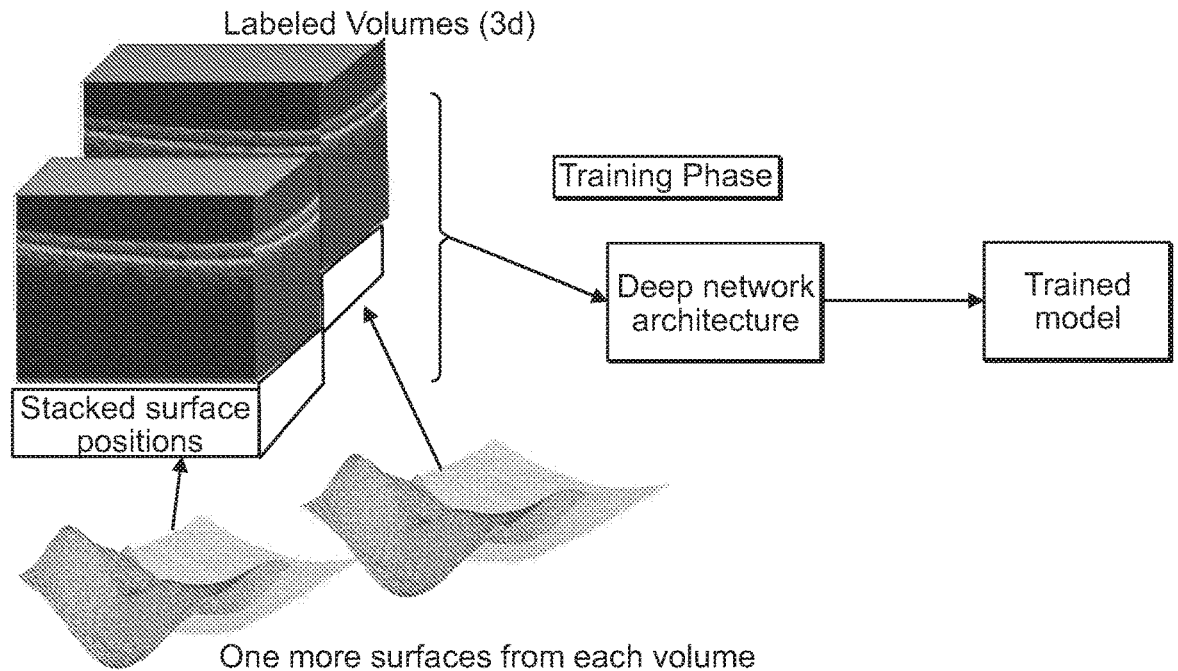
FIGS. 15-16 show another embodiment of the training and testing phases of a neural network process.

In an embodiment shown in FIG. 15, in the training phase the surface information from one or more surfaces would be encoded directly into the volume by adding the surface heights directly into the volume data structure. For example, if the volume V contains image data with dimensions Width×Height×Depth and k surfaces (which each has a dimension of Width×Height) are also input used, the k surfaces locations would be added to V such that its new size would be Width×Height×(Depth+k). The model would then be trained as above using a neural network with backpropagation.

Figure 16:
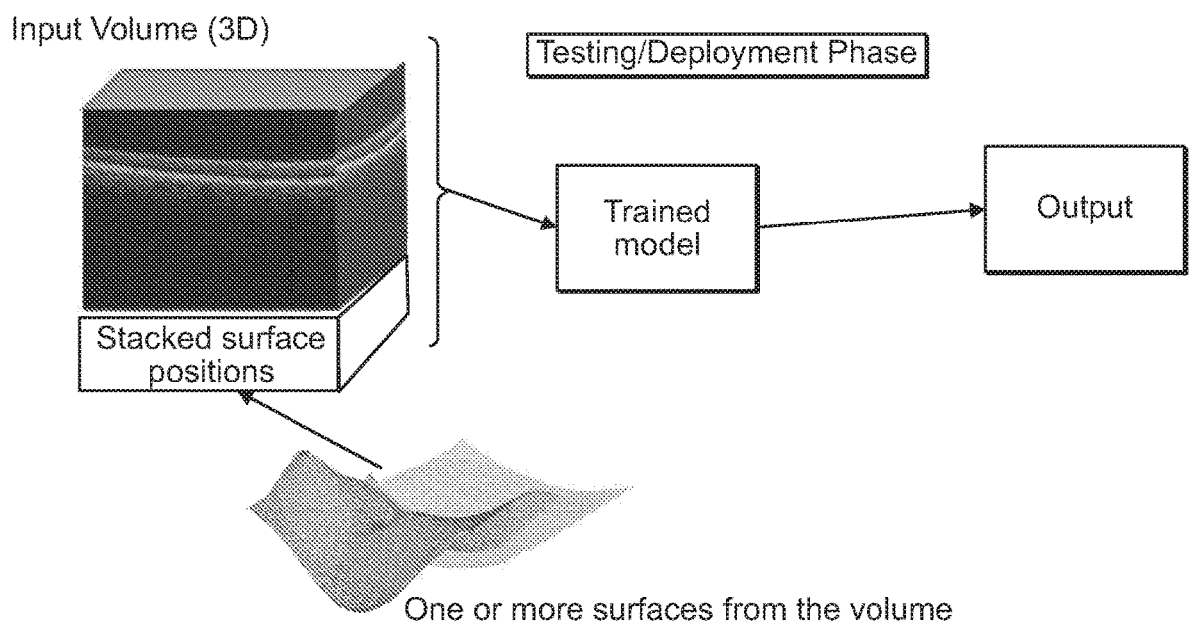

The testing phase (shown in FIG. 16) would proceed analogously with the input volume (Width×Height×Depth) being augmented with the k (Width×Height) surfaces such that the input to the model would have dimensions Width× Height×(Depth+k). This input would be run through the model to generate an output. It would be obvious to one skilled in the art to apply this same process to 2D images with 1D surfaces.

In each of the train/test embodiments described herein, it should be obvious to one skilled in the art that a convolutional neural network could be used (trained on a group of volumes or images) or a recurrent neural network could be used (trained on a group of sequences of volumes or images).

Figure 17:
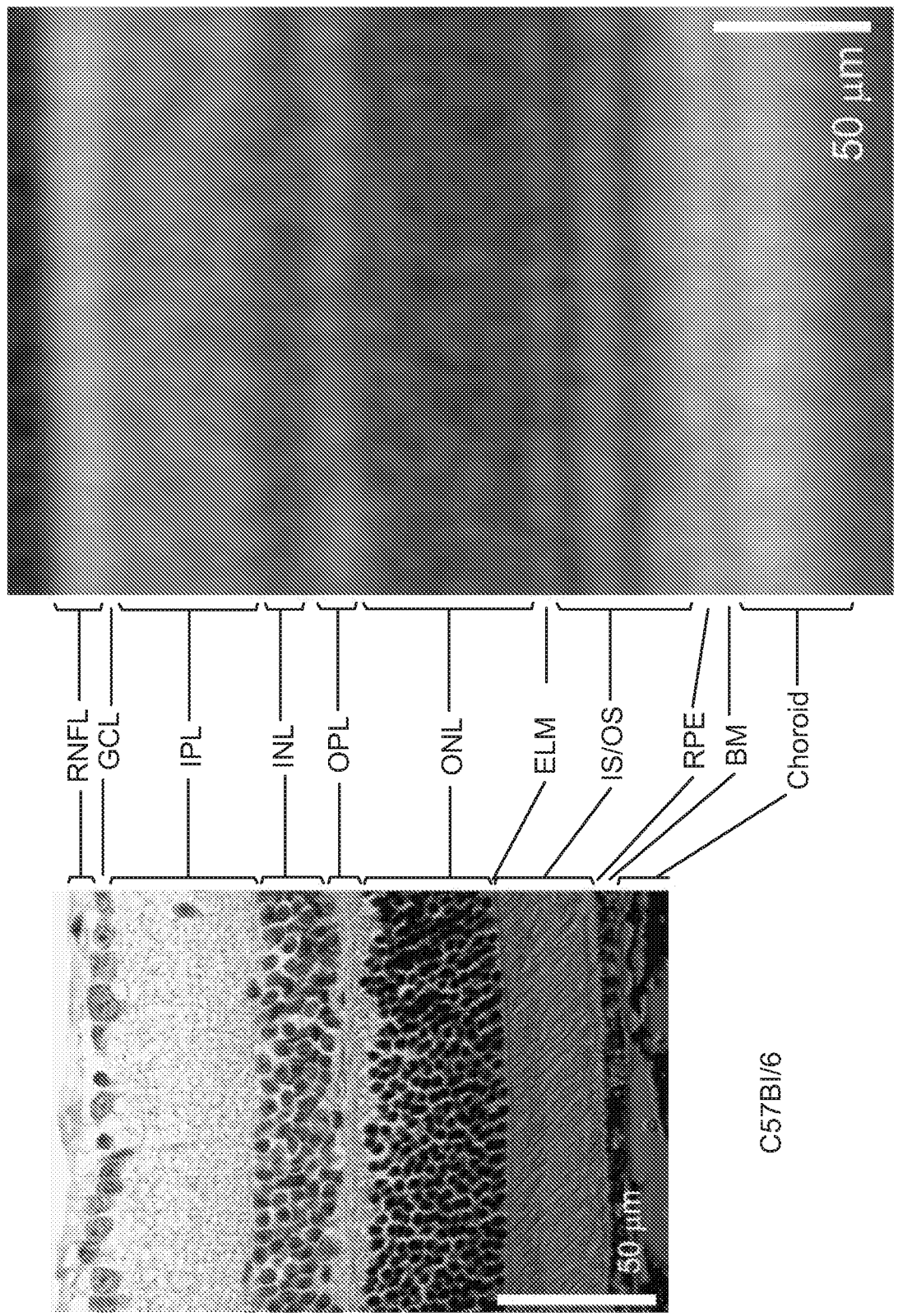
FIG. 17 shows layers of a retina where methods of the invention could detect textural changes.

The neural networks described herein can learn the texture distributions to extract alternative features from the OCT images than would otherwise be recognizable. Within a given layer of the retina one can expect texture to appear with a fairly consistent pattern in a normal eye. An example of a mouse eye where histology data is more readily available is shown in FIG. 17. Changes occurring at the cellular level would affect these textures. And while it is possible that with a normal aging process such structural changes occur, the visible changes in texture as seen in OCT images would likely occur in a uniform way. The present methods can classify the result using the fully-connected layer and the softmax layer. The CNN generates the features that are used by these later layers to do the classification. The CNN is essentially learning the texture distributions. This means that, using the disclosed methods of preprocessing, alternative feature extractors can be applied, which might then be classified using either traditional means or another neural network.

The discriminatory information content, or features, learned by sophisticated CNN's varies through the image. This can be seen by looking at the outputs before the final classification stages of the network. In particular, while information content may be localized to a particular anatomical layer, such as the RPE or choroid, it may be uniformly distributed within such layers in cases that do not soon after progress to a more advanced stage of AMD, or conversely it may be non-uniformly distributed in those that did. Novel features can be derived directly from the image data using the disclosed preprocessing pipeline.

Figure 18:
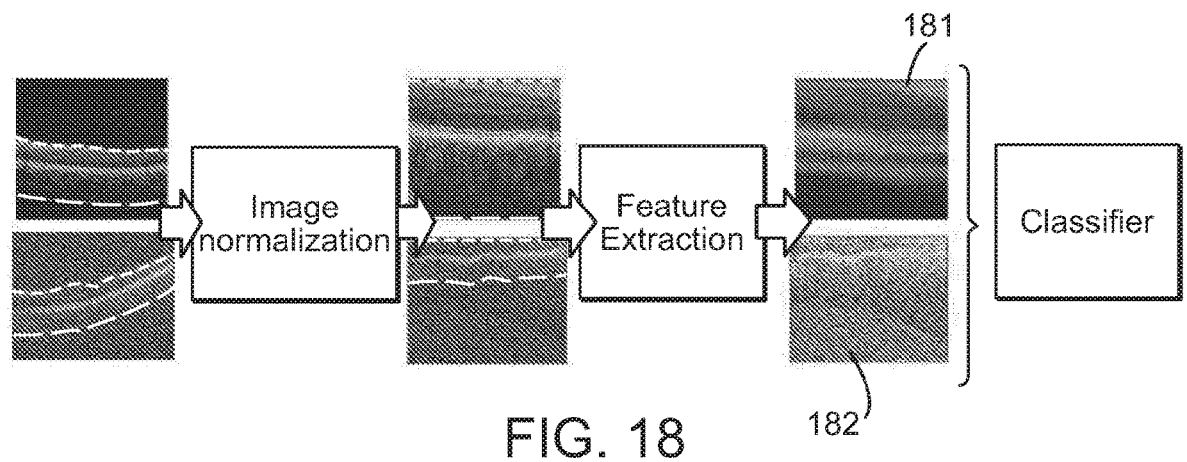
FIGS. 18-19 show activation map outputs from given input images.

As previously described, the input images have surfaces applied that facilitate the normalization approach. This then allows them to be deployed in a feature extraction system, which may also be trained. In FIG. 18, the features are indeed learned, and the responses are shown as activation maps. In the two images that are shown as outputs to this system, labeled 181 and 182, the cases have a different form of preprocessing, and different feature extractors. The outputs (images 181 and 182) of the feature extraction system are then passed to a classifier. The classifier might simply look at statistical measures, such as mean and standard deviation, or information theoretic measures, such as entropy, or indeed be a learned system such as a random forest classifier or a support vector machine. The classifier would then relate a disease state or a change of state. The classifier could include a CNN or an RNN, as previously described, to learn features. Standard texture measures include, but are not limited to: co-occurrence matrices; the central moments evaluated from the image histogram; Laws texture measures; or Fourier domain measures. The preprocessing normalization step places all relevant data in space that better facilitates feature extraction and classification in the processing pipeline.

Figure 19:
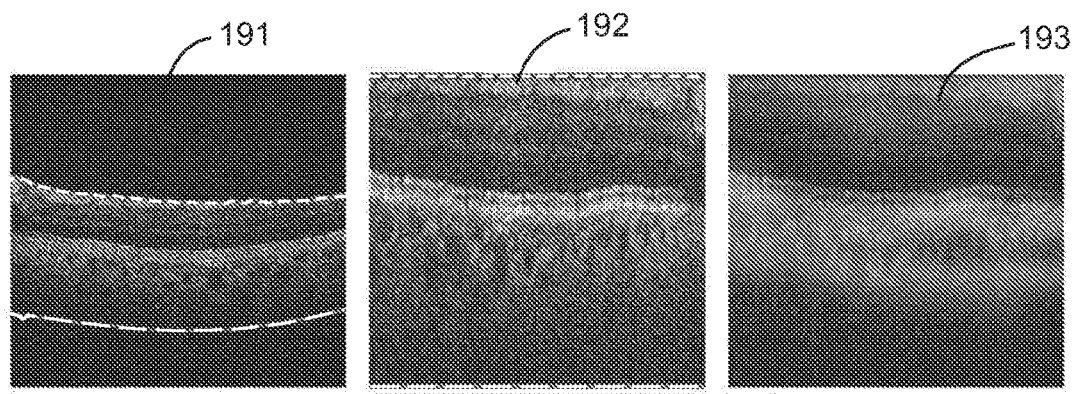

FIG. 19 shows an example activation map 193 for a given input image 191. The normalized image 192 is based on the segmentation (red and magenta lines). As can be seen, the most important information is in the choroid (below the magenta dashed lined in image 191). This has real physical relevance, as wet AMD involves choroidal neovascularization. The activation maps 193 show where in the image data the predictive power is, so this is indicative of where the distinguishing patterns are located which itself may have future relevance to localized disease treatment. For example, in the case of Example 1 discussed below, in cases that are not progressors (i.e., that do not progress to wet AMD), the patterns are uniformly distributed; whereas in cases that are progressors, the distribution is more focal. This shows that there are underlying, descriptive intensity patterns that would otherwise go unnoticed but for the methods of the present invention.

The activation maps show to the discriminatory power of the data at all spatial locations. The distribution of these maps is extremely important to the classification task and may, therefore, be used as a higher order feature both for prognosis and disease detection. Furthermore, this information can also be used to segment and measure regions. In the example image of FIG. 19, the activation map 193 is "hottest" in the choroid. A simple thresholding scheme would reveal where the choroid is adding an additional endpoint, namely choroidal thickness. The spatial distribution is therefore key in relating to the health of the anatomy and also the extent of the anatomy. The disclosed techniques can be used to delineate anatomy, determine how functional that anatomy is, and predict regions in that anatomy whose function will change (i.e., the prognosis).

As has been described, the disclosed methods have applicability to many diseases and conditions. The examples shown however relate to AMD, which is a particularly relevant condition for the disclosed invention. That is because traditional OCT analysis looks only at thickening of the retina, which is associated with the more aggressive form of AMD (wet or exudative) but once that condition is recognizable it may be too late to be useful for treatment. Most AMD cases are the milder form of AMD, dry or non-exudative. It is incredibly important to have a better prognostic for dry to wet conversion. Dry AMD can be watched, but wet AMD leads to blindness. To be able to better assess the risk of a given patient converting would enable earlier treatment and better outcomes. It may also lead to new therapeutics developed based on clinical endpoints created by this method, as this is a new biomarker. The methods described above are particularly useful for predicting conversion to wet AMD, which cannot be done reliably with structural measures alone (retinal thickness between layers).

As mentioned above, OCT angiography (OCTA), and in particular swept-source (SS) OCTA may be useful in imaging subclinical neovascularization. OCTA images blood flow by taking multiple images in the same location and using a decorrelation algorithm to detect the motion of the blood cells as signal. By these means OCTA is able to resolve, for example, flow in the capillary beds. Being able to see the choriocapillaris and delineate areas of perfusion/non-perfusion opens a new window onto vascular health in the retina, including the much needed ability to see and assess subclinical neovascular complexes. The deep learning methods described above may also be used with OCTA to look at flow as seen in the choriocapillaris. Using OCTA, perfusion or flow maps are used to detect nonexudative neovascular AMD. Activation maps may be correlated with flow maps, allowing for the ability to identify subclinical CNV.

In addition to AMD, another disease which would have diagnostic and prognostic benefits from the disclosed methods is multiple sclerosis (MS). In MS, the disease progresses through various states of relapse remitting MS (RRMS), primary and secondary progressive, and progressive relapsing. Inner nuclear layer (INL) thickness, a neuronal layer of the retina that is visible with OCT, is predictive of disease progression. The change in INL thickness occurs when the edema are large. Being able to identify prognostic intensity patterns in that layer before the thickening might offer an earlier prediction of disease. The approach described above could be learned to see texture changes in that layer before thickening occurs, therefore offering an earlier prognostic.

As would be recognized by a person having ordinary skill in the art, any condition that involves changes in the retinal layers could be analyzed and/or predicted using methods of the invention. These include ocular disorders, central nervous system disorders, and other diseases.

Figure 28:
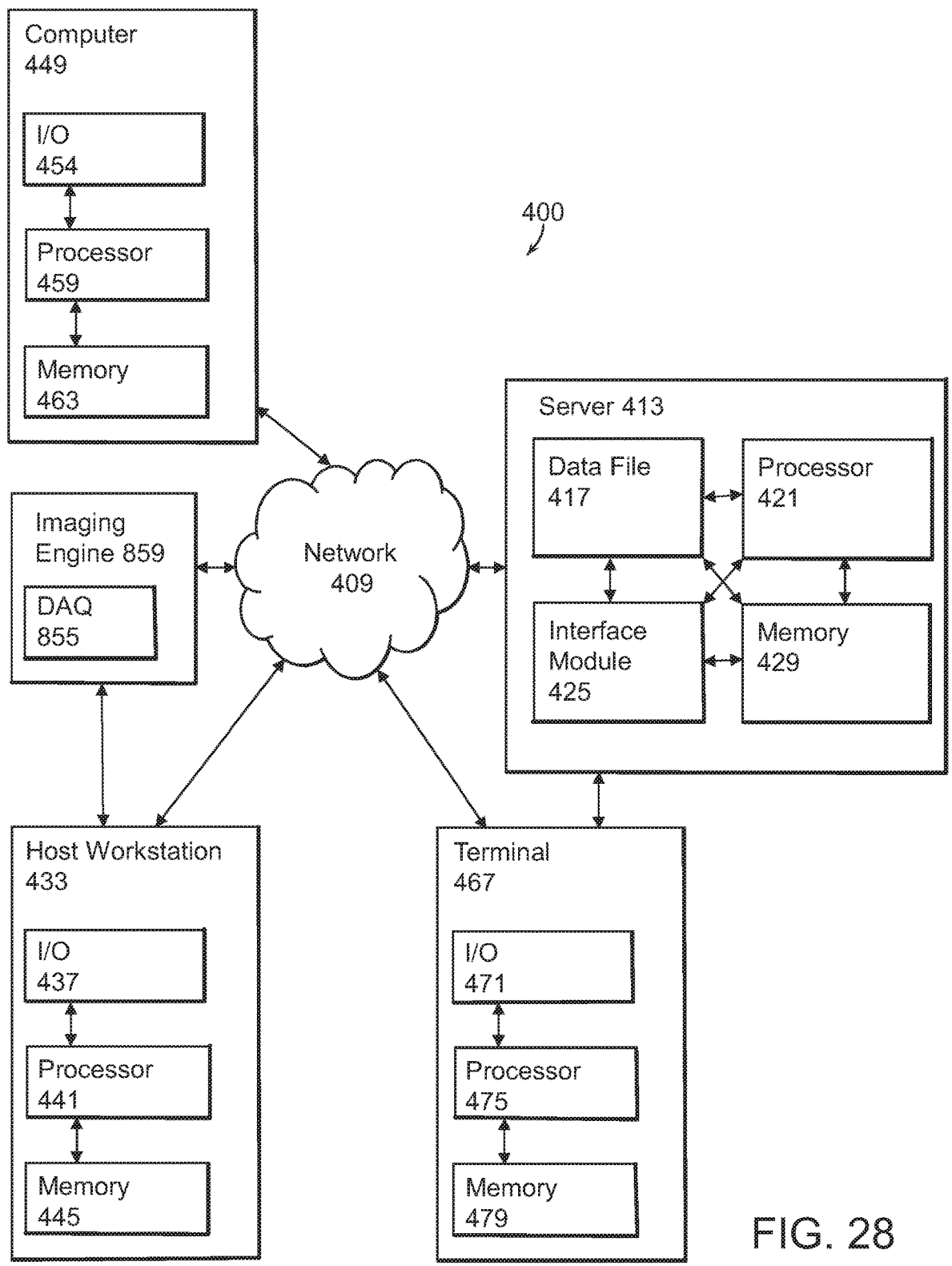
FIG. 28 is a computer system diagram according to certain embodiments.

Embodiments of the invention are implemented in a computer environment. In some embodiments, a user interacts with a visual interface and puts in parameters or makes a selection. Input from a user (e.g., parameters or a selection) are received by a processor in an electronic device such as, for example, host workstation 433, server 413, or computer 449. The selection can be rendered into a visible display. An exemplary system including an electronic device is illustrated in FIG. 28. As shown in FIG. 28, imaging engine 859 communicates with host workstation 433 as well as optionally server 413 over network 409. In some embodiments, an operator uses host workstation 433, computer 449, or terminal 467 to control system 400 or to receive images. An image may be displayed using an I/O 454, 437, or 471, which may include a monitor. Any I/O may include a keyboard, mouse or touchscreen to communicate with any of processor 421, 459, 441, or 475, for example, to cause data to be stored in any tangible, nontransitory memory 463, 445, 479, or 429. Server 413 generally includes an interface module 425 to effectuate communication over network 409 or write data to data file 417. Methods of the invention can be performed using software, hardware, firmware, hardwiring, or combinations of any of these. Features implementing functions can also be physically located at various positions, including being distributed such that portions of functions are implemented at different physical locations (e.g., imaging apparatus in one room and host workstation in another, or in separate buildings, for example, with wireless or wired connections).

Processors suitable for the execution of computer program include, by way of example, both general and special purpose microprocessors, and any one or more processor of any kind of digital computer. Generally, a processor will receive instructions and data from a read-only memory or a random access memory or both. The essential elements of computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, NAND-based flash memory, solid state drive (SSD), and other flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

The subject matter described herein can be implemented in a computing system that includes a back-end component (e.g., a data server 413), a middleware component (e.g., an application server), or a front-end component (e.g., a client computer 449 having a graphical user interface 454 or a web browser through which a user can interact with an implementation of the subject matter described herein), or any combination of such back-end, middleware, and front-end components. The components of the system can be interconnected through network 409 by any form or medium of digital data communication, e.g., a communication network. Examples of communication networks include cell networks (3G, 4G), a local area network (LAN), and a wide area network (WAN), e.g., the Internet.

Where methods of the invention employ a client/server architecture, steps of methods of the invention may be performed using the server 413, which includes one or more of processors and memory, capable of obtaining data, instructions, etc., or providing results via an interface module or providing results as a file. The server 413 may be provided by a single or multiple computer devices, such as the rack-mounted computers sold under the trademark BLADE by Hitachi. The server 413 may be provided as a set of servers located on or off-site or both. The server 413 may be owned or provided as a service. The server 413 or the storage may be provided wholly or in-part as a cloud-based resources such as Amazon Web Services or Google. The inclusion of cloud resources may be beneficial as the available hardware scales up and down immediately with demand. The actual processors—the specific silicon chips—performing a computation task can change arbitrarily as information processing scales up or down. In an embodiment, the server 413 includes one or a plurality of local units working in conjunction with a cloud resource (where local means not-cloud and includes or off-site). The server 413 may be engaged over the network 409 by the computer 449 and either or both may engage storage. In system 400, each computer preferably includes at least one processor coupled to a memory and at least one input/output (I/O) mechanism.

Deep-learning algorithms heavily rely graphical processing units (GPUs) to perform learning as there are often millions of parameters to be determined. In the deployment of the models, the inference, recognition or segmentation step may also need such powerful parallel processing as offered by GPUs requiring therefore that deployment might, depending on the model and amount of input data, require specialized hardware, in addition to a CPU, to run efficiently. The GPUs are typically housed on graphics cards. As such, the deployment can use a regular PC with a graphics card or may instead use servers housed in the cloud. This suggests that one realization of these methods would involve pushing the image data to the cloud where the processing occurs, ahead of retrieving the information locally. The receiving device could then be a computer (PC), or a smartphone or tablet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include programming language known in the art, including, without limitation, C, C++, Perl, Java, ActiveX, HTML5, Visual Basic, or JavaScript.

A computer program does not necessarily correspond to a file. A program can be stored in a portion of file 417 that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over network 409 (e.g., as packets being sent from a server to a client, for example, through a Network Interface Card, modem, wireless card, or similar).

Writing a file according to the invention involves transforming a tangible, non-transitory computer-readable medium, for example, by adding, removing, or rearranging particles (e.g., with a net charge or dipole moment) into patterns of magnetization by read/write heads, the patterns then representing new collocations of information desired by, and useful to, the user. In some embodiments, writing involves a physical transformation of material in tangible, non-transitory computer readable media with certain properties so that optical read/write devices can then read the new and useful collocation of information (e.g., burning a CD-ROM). In some embodiments, writing a file includes using flash memory such as NAND flash memory and storing information in an array of memory cells include floating-gate transistors. Methods of writing a file are well-known in the art and, for example, can be invoked automatically by a program or by a save command from software or a write command from a programming language.

Example 1

A method for predicting the likelihood of conversion from early/intermediate to advanced, wet age-related macular degeneration (AMD) was assessed using optical coherence tomography (OCT) imaging and methods of deep learning. In this example, a deep learning convolutional neural network (CNN) with layer segmentation-based preprocessing shows strong predictive power with respect to the progression of early/intermediate AMD to advanced AMD. Such adjunct analysis could be useful in, for example, setting the frequency of patient visits and guiding interventions.

Seventy-one eyes of 71 patients with confirmed early/intermediate AMD with contralateral wet AMD were imaged using Topcon OCT (3D OCT-1000) over two years. These eyes were divided into two groups: eyes that did not convert to wet AMD (n=40), and those that did (n=31). Two deep convolutional neural networks (CNN) were trained using the OCT data at baseline (year 0): (1) VGG16, a popular CNN for image recognition was fine-tuned and (2) a novel, simplified CNN architecture was trained from scratch. Preprocessing was added in the form of a segmentation-based normalization to reduce variance in the data and improve performance. The new architecture, AMDnet, with preprocessing achieved an area under the ROC curve (AUC) of 0.89 at the B-scan level and 0.91 for volumes. Results for VGG16, an established deep neural network architecture, with preprocessing were 0.82 for B-scans/0.87 for volumes vs. 0.66 for B-scans/0.69 for volumes without preprocessing. These results show a deep learning CNN with layer segmentation-based preprocessing gives strong predictive power for the progression of early/intermediate AMD to advanced, wet AMD. The use of the segmentation-based preprocessing was shown to improve overall performance regardless of the network architecture.

Patients with unilateral, neovascular AMD who were imaged using Topcon OCT (3D OCT-1000) in both eyes over 2 years were identified from the hospital database. These eyes were divided into 2 groups: non-progressors who did not convert from early/intermediate to advanced AMD (n=40); and those who progressed to wet AMD (n=31). In Group 1 (the non-progressors), the earliest OCT scan of a 3 scan/2 year protocol was used. And in an effort to distance the data used from the actual conversion event, for each member of Group 2 (the progressors), the date of the last clinic visit before the confirmation of CNV was recorded and the scan used was the earliest on record before that date (up to 2 years prior). This study was approved by the Ethical Review Board of Moorfields Eye Hospital (ROAD 17/004) and adhered to the principles of the Declaration of Helsinki. 71 participants (43 females [60.6%] and 28 males [39.4%]) were included in the study. The non-progressors consisted of 20 females and 20 males. The progressors consisted of 23 females and 8 males. Age ranges were similar between the two cohorts. The demographics of the study subjects are shown in Table 1 below:

| Variable | Total | AMD Nonprogressors | AMD Progressors |
| --- | --- | --- | --- |
| Number of eyes | 71 | 40 | 31 |
| Age | | | |
| Mean (SD) | 74 (8.5) | 72 (8.7) | 76 (7.5) |
| Median | 76 | 72.5 | 77 |
| Minimum-Maximum | 57-91 | 57-89 | 62-91 |

-continued

| Variable | Total | AMD Nonprogressors | AMD Progressors |
|---|---|---|---|
| Sex | | | |
| Female, n (%) | 43 (60.6%) | 20 (50%) | 23 (74.2%) |
| Male, n (%) | 28 (39.4%) | 20 (50%) | 8 (25.8%) |
| Laterality | | | |
| Right, n (%) | 48 (67.6%) | 26 (65%) | 22 (71%) |
| Left, n (%) | 23 (32.4%) | 14 (35%) | 9 (29%) |
| Follow-up Exam/ Conversion, months | | | |
| Mean (SD) | — | 23.75 (1.33) | 23.32 (2.06) |
| Median | | 24 | 24 |
| Minimum-Maximum | | 20-26 | 17-27 |

Segmentation-Based Preprocessing

Figure 20:
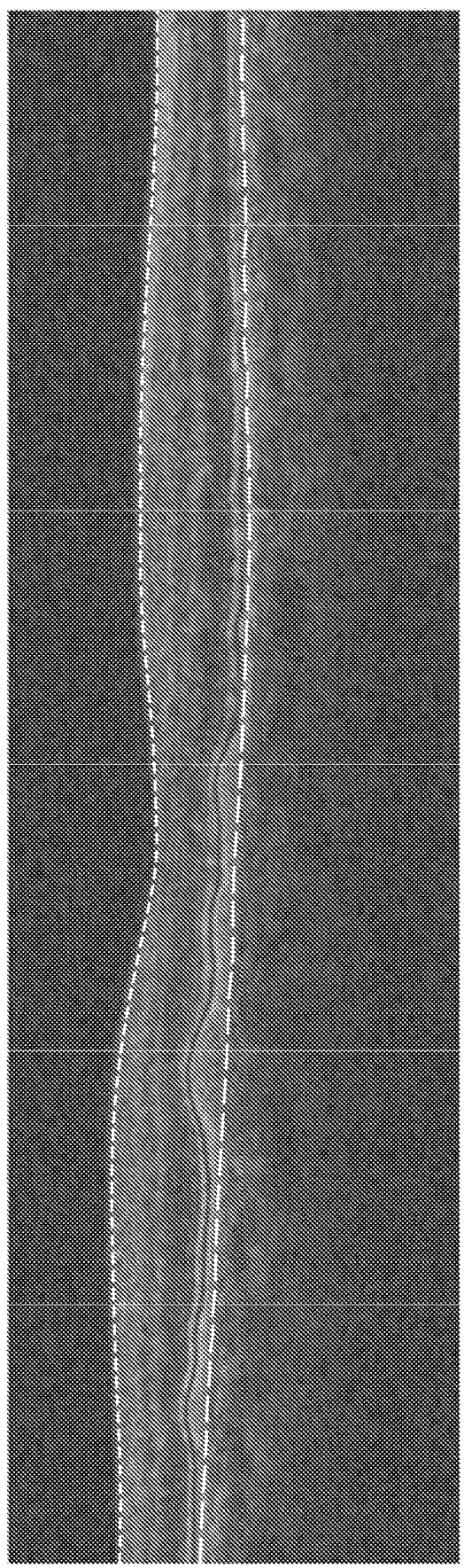
FIG. 20 shows a B-scan showing automated segmentation used for preprocessing.
Figure 21:
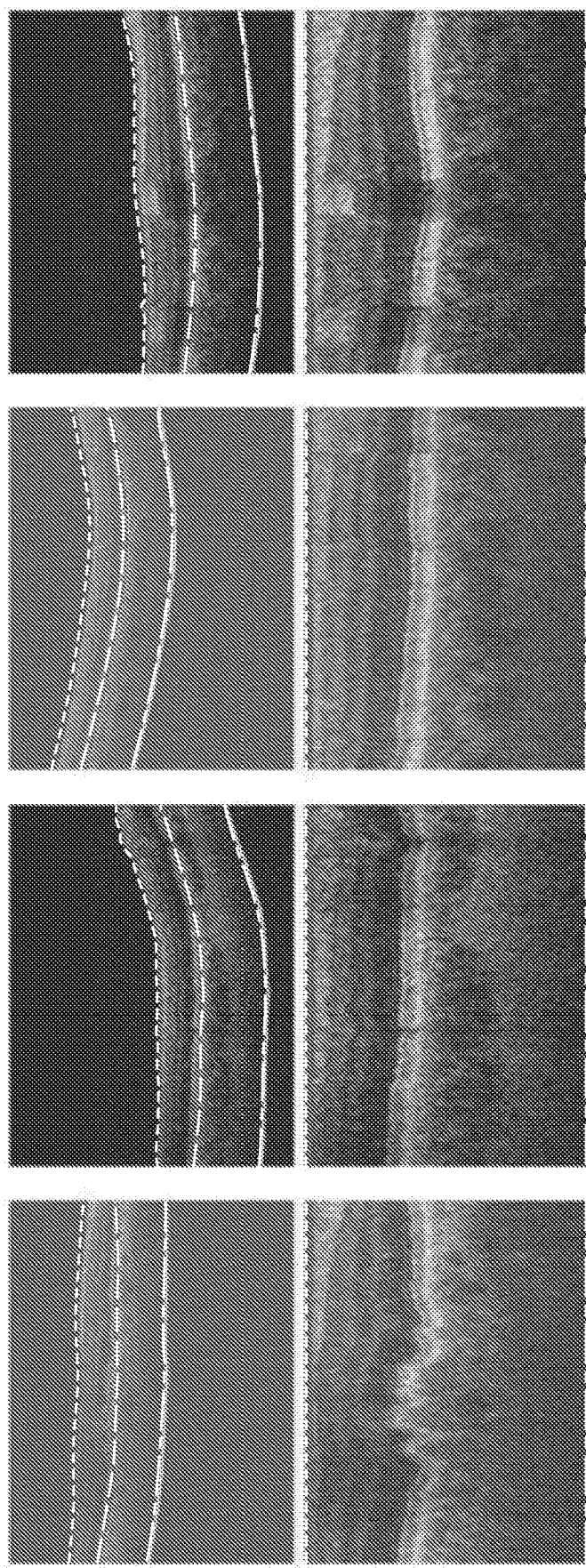
FIG. 21 shows an example of preprocessing used to normalize B-scans.

The 71 volumes were decomposed into 9088 B-scans which were preprocessed using automated layer segmentation software (Orion, Voxeleron LLC, Pleasanton, CA), to identify the inner limiting membrane (ILM) and Bruch's membrane (FIG. 20). Each B-scan was then cropped from the ILM to a fixed offset (390 microns) below Bruch's membrane and resampled to a uniform size (FIG. 21). The offset used was designed to capture choroidal information over a fixed area beneath the choriocapillaris. It was chosen based on [Manjunath, 2011] representing two standard deviations above the mean subfoveal choroidal thickness in a population with AMD. This preprocessing was performed to reduce the variance of the training set and create some invariance to scale.

A Transfer Learning Model

To evaluate the preprocessing, an existing, well-established deep convolutional neural network (CNN) (VGG16, [Simonyan, 2015]) was fine-tuned using transfer learning based on the well-defined strategy of retraining only the fully-connected layers of the model [Rattani, 2017]. We used the original papers fully-connected layer sizes (4096 neurons each) changing only the final layer from 1000 neurons to 2 neurons to fit our problem. Similar to [Rattani, 2017] we experimented with simpler versions with a smaller number of neurons, settling on 512 and 128 neurons for the first two fully-connected layers, respectively. This process was applied to both the raw and preprocessed B-scans. The raw and preprocessed B-scans were resized to 224×224 to match VGG16's expected input. The training was run for 2500 epochs using stochastic gradient descent with Nesterov momentum and a learning rate of 5e-5. To avoid overtraining, we used early stopping with a patience of 20. The resulting classifiers were evaluating using 5-fold cross validation taking care that the splits were made at the volume level so that no one patient's data ever appeared in both the training and testing sets.

The AMDnet Model

Following on this work, we explored alternate architectures in an effort to further improve the results. We tried both deeper, more complex networks as well as shallower, simpler ones and eventually settled on the latter. AMDnet (shown in FIG. 5) consists of just 3 convolutional layers with varying amounts of pooling. The number of parameters for this model is just over 2M vs. more than 27M (12M trainable) for VGG16. Given the relatively small size of the dataset, we took care to regularize this model in three specific ways:

1. We used dropout regularization with a percentage of 45% at the end of all but one of the convolutional and fully-connected layers. Dropout essentially acts during training on each batch to randomly remove a percentage of the previous layer's neurons. Dropout has the effect of averaging an ensemble of classifiers which produces more robust results and resists overtraining.

2. We used L2 regularization for each of the convolutional layers which penalizes very large weights and has the effect of simplifying the model.

3. We used maxnorm regularization for the dense layers which works in a similar fashion to L2 regularization above.

The table shown in FIG. 22 has a detailed breakdown of the architecture of AMDnet. We evaluated AMDnet using the same 5-fold cross validation as previously described.

Feature analysis.

In an effort to tease out what latent features the classifier is relying on, and perhaps learn something about disease process itself, we have performed both saliency and class activation analyses of the outputs of the neural network. Saliency visualizes the gradient of the output signal with respect to the input data. Class activation maps show the regions of the convolutional filters that are most discriminative with respect to a specific class. Such visualizations help interpret the overall results, especially in asking whether the method makes basic sense and whether artifacts or irrelevant features are driving the performance. This we revisit more thoroughly in the discussion.

Results

Figure 23:
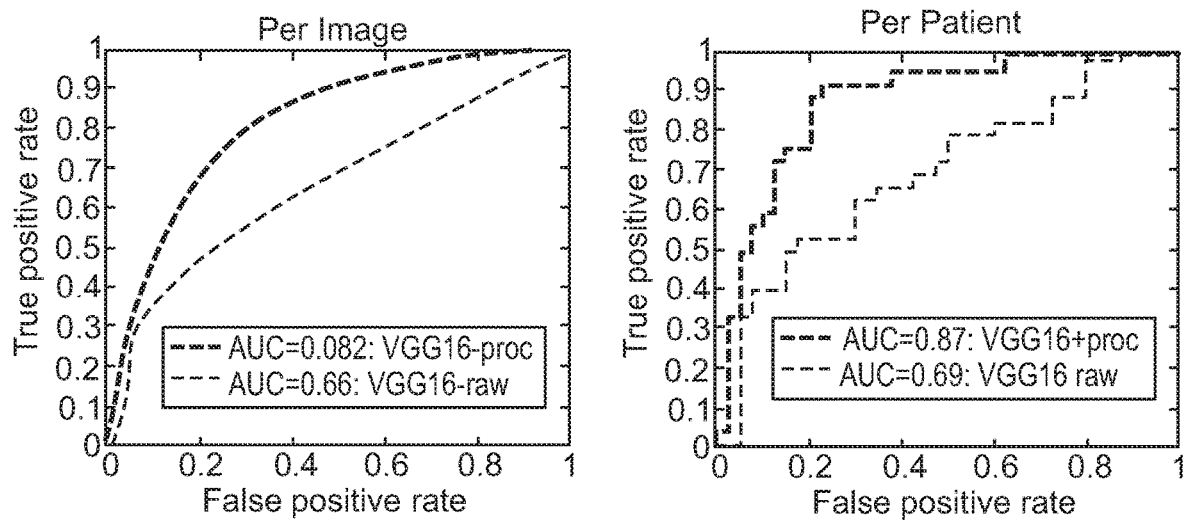
FIGS. 23-24 show results with and without processing.
Figure 24:
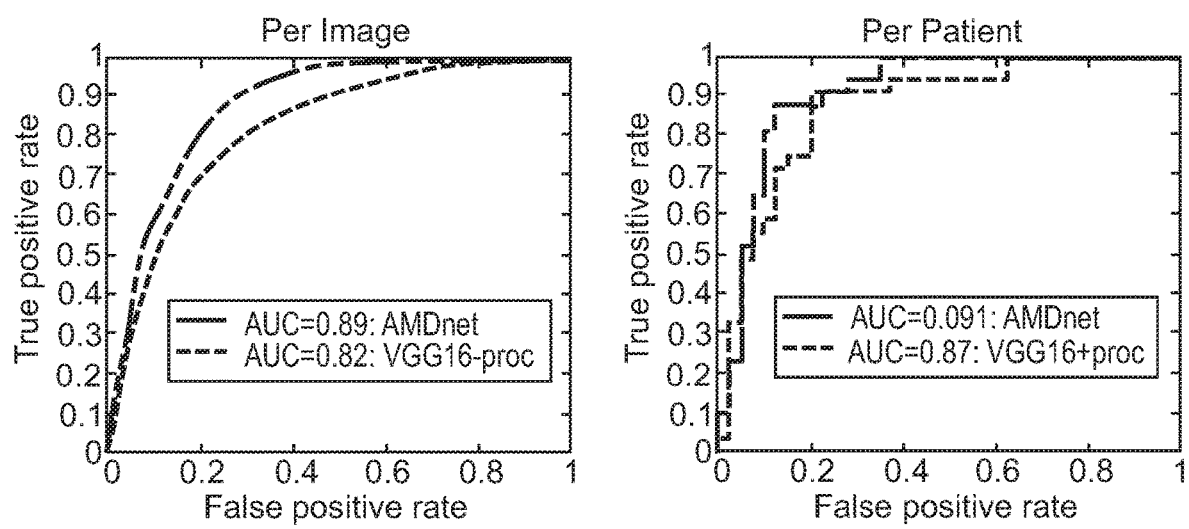
Figure 27:
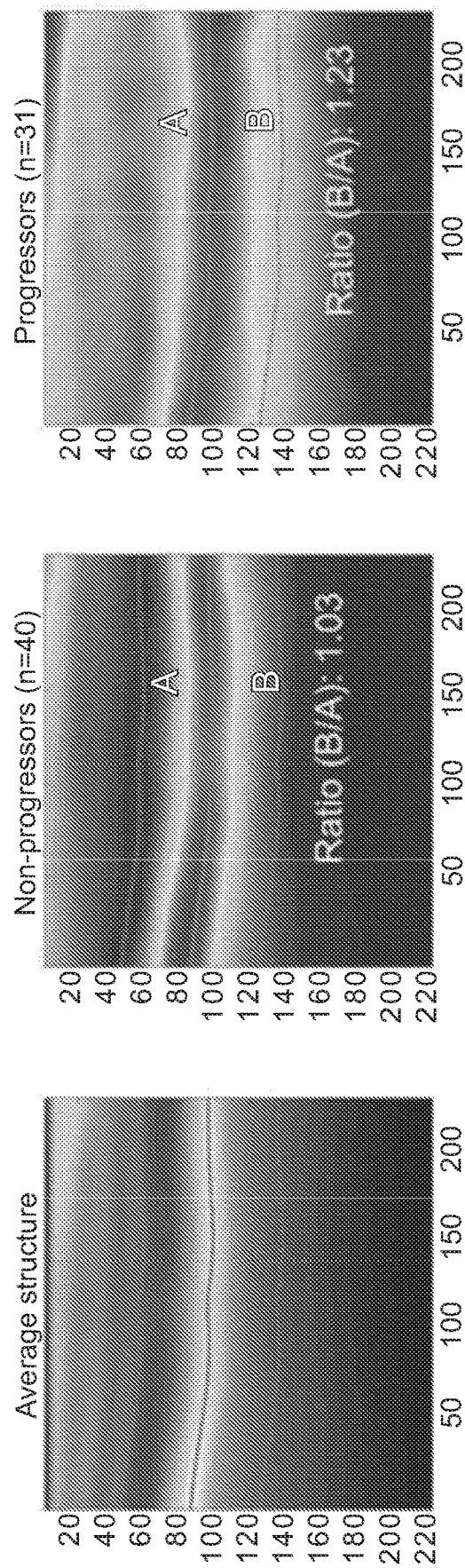
FIG. 27 shows quantitative analysis of activations between progressors and non-progressors.

To evaluate each classifier, we calculated its receiver operating characteristic (ROC) curve and report both the ROC curve and the area under the curve (AUC). The results measuring the effect of the preprocessing (FIG. 23) are presented at both the B-scan and volume levels. For VGG16 with preprocessing, the AUC was 0.82 at the B-scan level and 0.87 at the volume level while the same run without preprocessing (only scaling to match the VGG16 input) had AUC's of 0.67 and 0.69, respectively. The results for the same 5-fold validation for AMDnet are shown in FIG. 24. We achieve a marked improvement with AMDnet at the B-scan level (0.89) and at the volume level (0.91). Interestingly, we also performed simple augmentation of the data (adding small rotations plus noise) but were unable to improve the algorithm's performance. This very clearly demonstrates the benefits of preprocessing as regardless of network and evaluation metric, the performance improves each time. The results of the feature analysis, shown in FIGS. 25 and 26, illustrate that the areas around the retinal pigment epithelium (RPE) and choroid seem to be the most useful to the classifier in making its predictions. This analysis shows that, in particular, pixels around the RPE have the largest impact on the final score of the classifier. It also suggests more sub-RPE choroidal involvement for progressors vs. non-progressors (FIG. 27).

From the physiological point of view, the signal that is generated is localized to where a specialist would suggest looking. The deep learning algorithm has only, however, been told to concentrate on retinal tissue from the ILM down, and not to specifically look below the RPE. The saliency/activation maps emphasize these regions, and it is reassuring to see that the supervised learning approach is clearly not latching on to noise in the signal which would be indicative of overtraining, same eye data split across test and training sets, or any other method of bias that could be introduced. In looking at the saliency maps of FIG. 25, one is drawn to the fact that there is less influence of information in the choroid in the non-progressors, which is consistent with the grad-cam map of FIG. 26 where information is concentrated at the RPE layer. This could be interpreted to inform on that layer's integrity, which in the case of non-progressors is less likely to be afflicted by the disease state. Conversely, the progressors show that signal beneath the RPE and in the choroid is having a greater influence on the final classification assigned to them by the network (FIG. 27); i.e., that they are at greater risk of advancing to wet AMD. Perhaps integrity of the choriocapillaris is important to the prognosis, as are the indications from use of OCTA.

An alternative anatomical feature that is suggestive of early CNV is the "double-layer sign" that forms due to a very shallow retinal pigment epithelial detachment (PED). This is a subtle feature that can easily be missed in OCT data and is currently being researched with the support of OCTA as an indication of subclinical neovascularization. Similar "multilaminar" features have been described by [Querques 2014] in association with regressing drusen, some of which they associate with fractures in Bruch's membrane, and susceptibility therefore to CNV. A further association of such a feature is made to what [Mukkamala 2012] has described an "onion sign" occurring beneath the RPE in type 1 CNV, but such buildup of lipoprotein, it is argued, may allow this to appear also in dry AMD. Other linear features, also reported beneath the RPE in [Spaide 2009], but here as sub-RPE neovessels, give credence to early structural changes, again directly below the RPE that affect the OCT signal and have prognostic value. Both the salience and grad-cam maps indicate the same regions as informing on progression, and the RPE as informing on non-progression. Further studies with better choroidal imaging and perhaps OCTA support will help us better understand what we are seeing.

One simple interpretation of the findings is that the neural network has discovered specific patterns, or textures indicative of pathological change. Pathology detection using OCT texture analysis has been previously researched. Such approaches failed to gain traction, but in the advent of better computational resources and sophisticated learning approaches, we envisage a resurgence in such work. The texture descriptors developed by [Gossage 2003] were examples of hand-crafted features, a technique that has been superseded by the ability to instead learn the features through deep learning. Similarly, in the work from [de Sisternes 2014] and [Niu 2016], the features were manually designed, and, through extensive use of regression, applied to temporal data in their final model. Through learning the features in a systematic way afforded by deep neural networks, more powerful and better regularized solutions are now possible.

As shown here, the activation maps generated for a given image strongly indicate that the most informative and predictive areas in the image are in the choroid. Neural networks are trained on data from dry AMD cases that progress to wet-AMD in the form of choroidal neovascularization and those that do not progress. That it occurs in the choroid where the disease takes root offers a strong physical argument that the signal is real, despite it being at this stage subclinical. That is, we have shown this method to potentially identify subclinical choroidal neovascularization (CNV).

Example 2

Another aspect of the present invention involves standardizing longitudinal analysis of OCT data. The longitudinal analysis described below is applicable to ophthalmic imaging, or any other type of OCT imaging. Often patients' clinical measurements using OCT are collected for purposes of disease diagnosis and management, including treatment response. It is important, therefore, to be able to compare these measurements over time to monitor a patient's progress.

Most OCT instruments provide some longitudinal functionality, but do not have a way to assess change over time if a patient's images were taken on a different machine. Common OCT machines are available from Zeiss International (Oberkochen, Germany) and Topcon Corporation (Tokyo, Japan), for example.

To make useful quantitative measurements of a patient's retina using OCT requires segmentation algorithms. Segmentation algorithms automatically delineate anatomical landmarks in an image (e.g. retinal layer interfaces, fluid pockets, areas of atrophy, etc.). These are usually developed for a given scanner by the manufacturer and are based on the image characteristics—noise, signal quality, etc.—of their instrument. The instrument manufacturers do not develop software for operating on other manufacturers' instruments because of the difficulty, the cost, and the impracticalities of reading the other, often proprietary, image formats.

Standardizing longitudinal analysis is particularly relevant in the real world where a patient may go to different doctors over time or may simply use a different machine from one time to the next. What is needed is a way to preserve the longitudinal history of the patient's anatomy and add to it over time.

The problem is more complex than merely comparing summary parameters from scan 1 on device A at time T0 to scan 2 on device B at time T1. Such a comparison does not account for motion that occurs between the scans. That is, the position of the scan at time T0 is likely different, perhaps just slightly, to the position at time T1, requiring, therefore, that change analysis accurately compensates for the residual mis-positioning between scans, a technique called image registration.

Accordingly, longitudinal analysis of the present disclosure provides the ability to read data in the different formats, image segmentation of the data, as well as image alignment of the scans over time. This is especially non-trivial as each manufacturer has its own, often proprietary data format that needs to be deciphered and understood before the images themselves can be further analyzed.

Methods of the invention involve reading in a plurality of data from an OCT device, analyzing the data using image analysis or machine learning methods to create summary parameters at various locations in the image. This could be image segmentation where the parameters are retinal thicknesses across the field of view (FOV) of the acquired data, or this could be flow measurements using OCT-angiography across the FOV of the acquired data. Other summary parameters could be fluid pocket volume, drusen count, drusen volume, vessel density, vessel tortuosity, vascular flow, vessel oxygenation, layer reflectivity, layer intensity, and so on. The methods further involve reading in a plurality of data from a different OCT device and analyzing the data using image analysis or machine learning methods to create summary parameters at various locations in the image, and then comparing the summary parameters from one analysis to the other at the same location via methods of alignment or image registration. Image registration may be by any method known in the art, such as affine transformation, linear transformation, rigid transformation, non-rigid transformation, or deformable transformation.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A method of assessing a likelihood of disease development in a subject, the method comprising:
receiving optical coherence tomography (OCT) data of a subject;
preprocessing the OCT data, wherein preprocessing comprises:
cropping a portion of an image of the OCT data into a new image to thereby normalize the OCT data, wherein cropping comprises selecting one or more features derived from a texture pattern of the OCT data; and
rescaling, based on segmented anatomy layer position information, the cropped portion to a uniform size;
processing, via a computer comprising a neural network, the normalized OCT data of the new image, wherein processing comprises analyzing the texture pattern via the neural network to extract the one or more features in the normalized OCT data that are descriptive of a disease state; and
based on the disease state shown in the processed normalized OCT data of the new image, making a prognostic measurement on the likelihood of disease development in the subject.

2. The method of claim 1, wherein the OCT data comprises B-scan data.

3. The method of claim 1, wherein the one or more features in the OCT data of the new image comprise a spatial pattern of intensities.

4. The method of claim 3, wherein the computer has been trained on a set of OCT data to correlate the spatial patterns with clinical outcomes.

5. The method of claim 4, wherein training involves analyzing the spatial patterns using the neural network.

6. The method of claim 5, wherein the neural network is a convolutional neural network or a recurrent neural network.

7. The method of claim 5, wherein the neural network comprises one or more convolutional layers.

8. The method of claim 5, wherein the spatial patterns are indicative or predictive of retinas that are healthy or pathological.

9. The method of claim 1, wherein the OCT data of the new image is indicative or predictive of choroidal neovascularization.

10. The method of claim 3, wherein the spatial patterns comprise patterns at a cellular level in a retinal layer.

11. The method of claim 1, wherein the disease state represents a deviation from normal.

12. The method of claim 1, wherein disease development comprises progression from dry age-related macular degeneration (AMD) to advanced AMD.

13. The method of claim 1, wherein the disease is multiple sclerosis or glaucoma.

14. The method of claim 13, wherein disease progression comprises progression from relapse remitting multiple sclerosis, primary progressive multiple sclerosis, secondary progressive multiple sclerosis, and progressive relapsing multiple sclerosis.

15. The method of claim 13, wherein the OCT data of the new image is indicative of thickness of the inner nuclear layer of the retina.

16. The method of claim 1, further comprising making a recommendation for treatment based on the prognostic measurement.

17. The method of claim 1, further comprising providing a localized treatment to an area indicative of the disease state.

18. The method of claim 17, wherein the localized treatment comprises anti-VEGF, stem cells, or targeted laser treatment.

19. The method of claim 1, wherein the uniform size is be based on one or more segmented layers.

20. The method of claim 19, wherein rescaling comprises:
rescaling the image to a fixed height; and
interpolating the OCT data to rescale the image to a fixed dimension.

* * * * *